(12) United States Patent
Ota et al.

(10) Patent No.: US 7,337,051 B2
(45) Date of Patent: Feb. 26, 2008

(54) SHIFT CONTROL APPARATUS FOR STEP-VARIABLE AUTOMATIC TRANSMISSION

(75) Inventors: Hirofumi Ota, Toyota (JP); Atsushi Honda, Seto (JP); Akiharu Abe, Toyota (JP); Atsushi Tabata, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 494 days.

(21) Appl. No.: 10/941,812

(22) Filed: Sep. 16, 2004

(65) Prior Publication Data

US 2005/0090355 A1 Apr. 28, 2005

(30) Foreign Application Priority Data

Oct. 3, 2003 (JP) ............................. 2003-346268

(51) Int. Cl.
*G06F 7/00* (2006.01)
(52) U.S. Cl. .................... 701/51; 701/52; 477/34; 74/473.18
(58) Field of Classification Search .................. 701/51, 701/56, 53, 52; 180/197; 475/123; 74/335, 74/473.18; 477/34
See application file for complete search history.

(56) References Cited

U.S. PATENT DOCUMENTS 5,873,802 A * 2/1999 Tabata et al. ................. 477/96
6,443,025 B2 * 9/2002 Ohashi et al. ............ 74/473.18
6,855,090 B2 * 2/2005 Tabata et al. ................ 477/107
7,076,355 B2 * 7/2006 Ota et al. ...................... 701/51

FOREIGN PATENT DOCUMENTS

| DE | 35 34 971 A1 | 4/1986 |
| DE | 42 39 133 C1 | 12/1993 |
| JP | 59-50261 | 3/1984 |
| JP | 5-65953 | 3/1993 |
| JP | 8-159267 | 6/1996 |
| JP | 2001-132832 | 5/2001 |

* cited by examiner

*Primary Examiner*—Gertrude A. Jeanglaude
(74) *Attorney, Agent, or Firm*—Oblon, Spivak, McClelland, Maier & Neustadt, P.C.

(57) ABSTRACT

A shift control apparatus for controlling shifting actions of a step-variable automatic transmission having a plurality of selectable groups of forward-drive positions (e.g., normal-spread group and narrow-spread or wide-spread group) having respective different sets of speed ratios, the automatic transmission having an automatic shifting mode in which the shifting actions take place automatically and a manual shifting mode in which the shifting actions are manually controllable, the shift control apparatus including a drive-position-group selecting portion operable upon switching of a shifting mode of the automatic transmission from the automatic shifting mode to the manual shifting mode, to select one of the selectable groups of forward-drive positions in the manual shifting mode, on the basis of the group which was selected last in the automatic shifting mode.

13 Claims, 22 Drawing Sheets

|     | C1 | C2 | C3 | C4 | B1 | B2 | B3 | SPEED RATIO | STEPPING RATIO |
|-----|----|----|----|----|----|----|----|-------------|----------------|
| 1st | ○  |    |    |    |    |    | ○  | 4.169       | 1.359          |
| 2nd | ○  |    |    |    |    | ○  |    | 3.067       | 1.351          |
| 3rd | ○  |    |    | ○  |    |    |    | 2.271       | 1.301          |
| 4th | ○  | ○  |    |    |    |    |    | 1.745       | 1.321          |
| 5th | ○  |    | ○  |    |    |    |    | 1.321       | 1.321          |
| 6th |    |    | ○  | ○  |    |    |    | 1.000       | 1.282          |
| 7th |    | ○  | ○  |    |    |    |    | 0.780       | 1.295          |
| 8th |    |    | ○  |    | ○  |    |    | 0.602       | SPREAD         |
| Rev |    | ○  |    |    |    | ○  |    | 2.644       | 6.921          |

|     | C1 | C2 | C3 | C4 | B1 | B2 | B3 | SPEED RATIO | STEPPING RATIO |
|-----|----|----|----|----|----|----|----|-------------|----------------|
| 1st | ○  |    |    |    |    |    | ○  | 4.169       | 1.359          |
| 2nd | ○  |    |    |    |    | ○  |    | 3.067       | 1.351          |
| 3rd | ○  |    |    |    | ○  |    |    | 2.271       | 1.301          |
| 4th | ○  | ○  |    |    |    |    |    | 1.745       | 1.321          |
| 5th | ○  |    |    | ○  |    |    |    | 1.321       | 1.321          |
| 6th |    |    | ○  | ○  |    |    |    | 1.000       | 1.232          |
| 7th |    | ○  |    | ○  |    |    |    | 0.811       | 1.253          |
| 8th |    |    | ○  |    |    |    |    | 0.648       | SPREAD         |
| Rev |    | ○  |    |    |    | ○  |    | 2.644       | 6.433          |

|  | C1 | C2 | C3 | C4 | B1 | B2 | B3 | SPEED RATIO | STEPPING RATIO |
|---|---|---|---|---|---|---|---|---|---|
| 1st | O |  |  |  |  |  | O | 4.169 | 1.359 |
| 2nd | O |  |  |  |  | O |  | 3.067 | 1.351 |
| 3rd | O |  |  |  | O |  |  | 2.271 | 1.301 |
| 4th | O | O |  |  |  |  |  | 1.745 | 1.321 |
| 5th | O |  | O |  |  |  |  | 1.321 | 1.321 |
| 6th |  |  | O | O |  |  |  | 1.000 | 1.282 |
| 7th |  | O | O |  |  |  |  | 0.780 | 1.295 |
| 8th |  |  | O |  | O |  |  | 0.602 | SPREAD |
| Rev |  | O |  |  |  | O |  | 2.644 | 6.921 |

| | C1 | C2 | C3 | C4 | B1 | B2 | B3 | SPEED RATIO | STEPPING RATIO |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | | ○ | | | | 0.765 | 1.308 |
| 8th | | | ○ | ○ | | | | 0.581 | 1.316 |
| Rev | | ○ | | | | ○ | | 2.644 | SPREAD 7.175 |

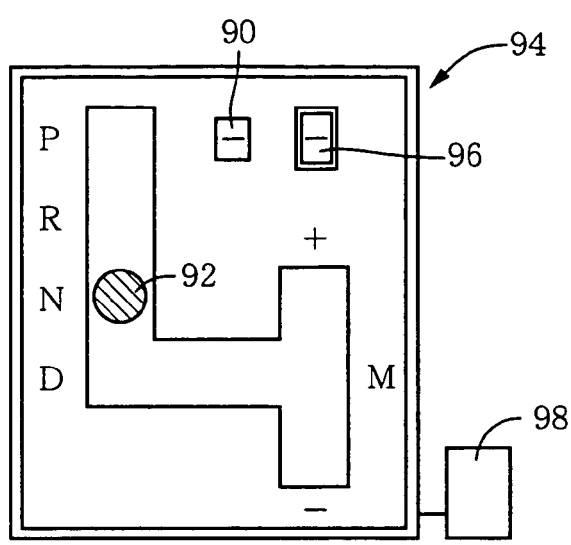
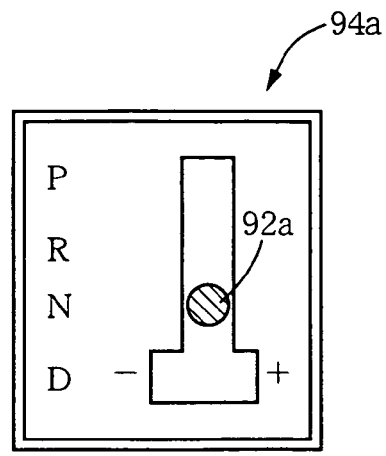
FIG.13A  FIG.13A'
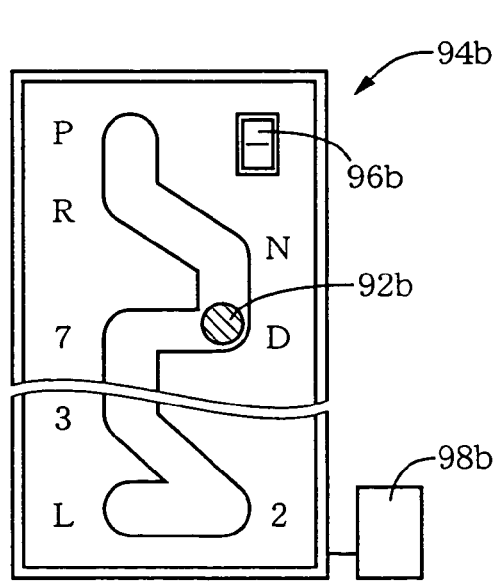
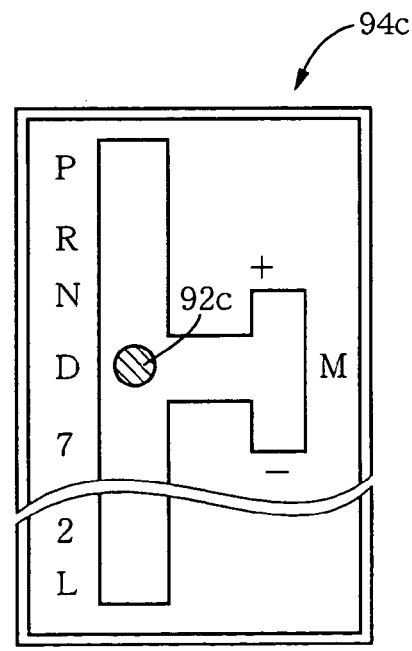
FIG.13B  FIG.13C

FIG.14

SHIFT LEVER MOVEMENT FOR RANGE SELECTION
+ ←—————————————————————→ −
UP                              DOWN

AUTOMATIC OR MANUAL SELECTION

| | | SPEED RATIO AND STEPPING RATIO | | FORWARD-DRIVE POSITIONS AVAILABLE IN EACH RANGE | | | | | |
|---|---|---|---|---|---|---|---|---|---|
| | | POSITION | SPEED RATIO | STEPPING RATIO | RANGE D | RANGE 7 | RANGE 6 | RANGE 5 | ... | RANGE L |
| NORMAL-SPREAD GROUP | | 1st | 4.169 | 1.359 | 1st | 1st | 1st | 1st | | 1st |
| | | 2nd | 3.067 | 1.351 | 2nd | 2nd | 2nd | 2nd | | |
| | | 3rd | 2.271 | 1.301 | 3rd | 3rd | 3rd | 3rd | | |
| | | 4th | 1.745 | 1.321 | 5th | 4th | 4th | 4th | ... | |
| | | 5th | 1.321 | 1.321 | 4th | 5th | 5th | 5th | | |
| | | 6th | 1.000 | 1.282 | 6th | 6th | 6th | | | |
| | | 7th | 0.780 | 1.295 | 7th | 7th | | | | |
| | | 8th | 0.602 | | 8th | | | | | |
| NARROW-SPREAD GROUP | | 1st | 4.169 | 1.359 | 1st | 1st | 1st | 1st | | 1st |
| | | 2nd | 3.067 | 1.351 | 2nd | 2nd | 2nd | 2nd | | |
| | | 3rd | 2.271 | 1.301 | 3rd | 3rd | 3rd | 3rd | | |
| | | 4th | 1.745 | 1.321 | 4th | 4th | 4th | 4th | ... | |
| | | 5th | 1.321 | 1.321 | 5th | 5th | 5th | 5th | | |
| | | 6th | 1.000 | 1.232 | 6th | 6th | 6th | | | |
| | | 7th | 0.811 | 1.253 | 7th | 7th | | | | |
| | | 8th | 0.648 | | 8th | | | | | |
| WIDE-SPREAD GROUP | | 1st | 4.169 | 1.359 | 1st | 1st | 1st | 1st | | 1st |
| | | 2nd | 3.067 | 1.351 | 2nd | 2nd | 2nd | 2nd | | |
| | | 3rd | 2.271 | 1.301 | 3rd | 3rd | 3rd | 3rd | | |
| | | 4th | 1.745 | 1.321 | 4th | 4th | 4th | 4th | ... | |
| | | 5th | 1.321 | 1.321 | 5th | 5th | 5th | 5th | | |
| | | 6th | 1.000 | 1.308 | 6th | 6th | 6th | | | |
| | | 7th | 0.765 | 1.316 | 7th | 7th | | | | |
| | | 8th | 0.581 | | 8th | | | | | |

|  | C1 | C2 | C3 | C4 | C5 | B1 | B2 | SPEED RATIO | STEPPING RATIO |
|---|---|---|---|---|---|---|---|---|---|
| 1st | ○ |  |  |  |  |  | ○ | 5.014 | |
| 2nd | ○ |  |  |  |  | ○ |  | 3.005 | 1.669 |
| 3rd | ○ | ○ |  |  |  |  |  | 2.000 | 1.502 |
| 4th | ○ |  |  | ○ |  |  |  | 1.499 | 1.334 |
| 5th | ○ |  | ○ |  |  |  |  | 1.249 | 1.200 |
| 6th |  |  | ○ | ○ |  |  |  | 1.000 | 1.249 |
| 7th |  | ○ | ○ |  |  |  |  | 0.800 | 1.250 |
| 8th |  |  | ○ |  |  |  | ○ | 0.667 | 1.200 |
| Rev |  | ○ |  |  |  |  | ○ | 4.000 | SPREAD 7.521 |

|  | C1 | C2 | C3 | C4 | C5 | B1 | B2 | SPEED RATIO | STEPPING RATIO |
|---|---|---|---|---|---|---|---|---|---|
| 1st |  |  |  |  | ○ |  | ○ | 4.286 | |
| 2nd |  |  |  |  | ○ | ○ |  | 2.762 | 1.552 |
| 3rd | (○) | ○ |  |  | ○ |  |  | 2.000 | 1.381 |
| 4th | ○ |  |  | ○ |  |  |  | 1.499 | 1.334 |
| 5th | ○ |  | ○ |  |  |  |  | 1.249 | 1.200 |
| 6th |  |  | ○ | ○ |  |  |  | 1.000 | 1.249 |
| 7th |  | ○ | ○ |  |  |  |  | 0.800 | 1.250 |
| 8th |  |  | ○ |  |  | ○ |  | 0.667 | 1.200 |
| Rev |  | ○ |  |  |  |  | ○ | 4.000 | SPREAD 6.429 |

|  | C1 | C2 | C3 | C4 | C5 | B1 | B2 | SPEED RATIO | STEPPING RATIO |
|---|---|---|---|---|---|---|---|---|---|
| 1st | ○ |  |  |  |  |  | ○ | 3.550 | |
| 2nd | ○ |  |  |  |  | ○ |  | 2.456 | 1.445 |
| 3rd | ○ | ○ |  |  |  |  |  | 1.818 | 1.351 |
| 4th | ○ |  | ○ |  |  |  |  | 1.349 | 1.348 |
| 5th |  |  | ○ | ○ |  |  |  | 1.000 | 1.349 |
| 6th |  | ○ |  | ○ |  |  |  | 0.792 | 1.263 |
| 7th |  |  |  | ○ |  | ○ |  | 0.632 | 1.254 |
| 8th |  |  | ○ |  |  | ○ |  | 0.526 | 1.200 |
| Rev |  | ○ |  |  |  |  | ○ | 2.597 | SPREAD 6.745 |

|       | C1 | C2 | C3 | C4 | C5 | B1 | B2 | SPEED RATIO | STEPPING RATIO |
|-------|----|----|----|----|----|----|----|-------------|----------------|
| 1st   |    |    |    |    | ○  |    | ○  | 4.589       |                |
| 2nd   |    |    |    |    | ○  | ○  |    | 2.839       | 1.616          |
| 3rd   |    | ○  |    |    | ○  |    |    | 1.818       | 1.561          |
| 4th   |    |    |    | ○  | ○  |    |    | 1.259       | 1.444          |
| 5th   |    |    | ○  | ○  |    |    |    | 1.000       | 1.259          |
| 6th   |    | ○  |    | ○  |    |    |    | 0.792       | 1.263          |
| 7th   |    |    |    | ○  |    | ○  |    | 0.632       | 1.254          |
| 8th   |    |    | ○  |    |    | ○  |    | 0.526       | 1.200          |
| Rev   |    | ○  |    |    |    |    | ○  | 2.597       | SPREAD 8.719   |

|  | C1 | C2 | C3 | B1 | B2 | B3 | B4 | SPEED RATIO | STEPPING RATIO |
|---|---|---|---|---|---|---|---|---|---|
| 1st | ○ |  |  |  |  | ○ | ○ | 4.020 | 1.480 |
| 2nd | ○ |  |  |  | ○ | ○ |  | 2.717 | 1.358 |
| 3rd | ○ | ○ |  |  | ○ |  |  | 2.000 | 1.300 |
| 4th | ○ | ○ |  | ○ |  |  |  | 1.538 | 1.271 |
| 5th | ○ |  | ○ | ○ |  |  |  | 1.211 | 1.211 |
| 6th | ○ | ○ | ○ |  |  |  |  | 1.000 | 1.275 |
| 7th-2 |  | ○ | ○ | ○ |  |  |  | 0.784 | 1.216 |
| 8th |  | ○ |  |  |  | ○ |  | 0.645 | SPREAD 6.231 |
| R1 |  | ○ |  |  | ○ |  | ○ | 3.636 |  |
| R2 |  | ○ | ○ |  |  |  | ○ | 2.797 |  |

| | C1 | C2 | C3 | B1 | B2 | B3 | B4 | SPEED RATIO | STEPPING RATIO |
|---|---|---|---|---|---|---|---|---|---|
| 1st | ○ | | | ○ | | | ○ | 3.092 | |
| 2nd | ○ | | | ○ | | ○ | | 2.090 | 1.480 |
| 4th | ○ | ○ | | ○ | | | | 1.538 | 1.358 |
| 5th | ○ | | ○ | ○ | | | | 1.211 | 1.271 |
| 6th-2 | ○ | ○ | ○ | | | | | 1.000 | 1.211 |
| 7th | | ○ | ○ | | ○ | | | 0.784 | 1.275 |
| 8th | | | ○ | | ○ | | | 0.645 | 1.216 |
| R1 | | ○ | | | ○ | | ○ | 3.636 | SPREAD 4.793 |
| R2 | | ○ | | ○ | | | ○ | 2.797 | |

FIG.32

| | SPEED RATIO | | FORWARD-DRIVE POSITIONS IN EACH RANGE | | | | | |
|---|---|---|---|---|---|---|---|---|
| | POSITION | SPEED RATIO | RANGE D | RANGE 7 | RANGE 6 | RANGE 5 | ... | RANGE L |
| SEVEN POSITIONS | 1st | 3.092 | 1st | NOT AVAILABLE | 1st | 1st | ... | 1st |
| | 2nd | 2.090 | 2nd | | 2nd | 2nd | | |
| | 3rd | 1.538 | 3rd | | 3rd | 3rd | | |
| | 4th | 1.211 | 4th | | 4th | 4th | | |
| | 5th | 1.000 | 5th | | 5th | 5th | | |
| | 6th-2 | 0.784 | 6th-2 | | 6th-2 | | | |
| | 7th | 0.645 | 7th | | | | | |
| EIGHT POSITIONS | 1st | 4.020 | 1st | 1st | 1st | 1st | ... | 1st |
| | 2nd | 2.717 | 2nd | 2nd | 2nd | 2nd | | |
| | 3rd | 2.000 | 3rd | 3rd | 3rd | 3rd | | |
| | 4th | 1.538 | 4th | 4th | 4th | 4th | | |
| | 5th | 1.211 | 5th | 5th | 5th | 5th | | |
| | 6th | 1.000 | 6th | 6th | 6th | | | |
| | 7th-2 | 0.784 | 7th-2 | 7th-2 | | | | |
| | 8th | 0.645 | 8th | | | | | |

|  | C1 | C2 | C3 | B1 | B2 | B3 | B4 | SPEED RATIO | STEPPING RATIO |
|---|---|---|---|---|---|---|---|---|---|
| 1st | ○ |  |  |  | ○ |  | ○ | 4.020 | 1.480 |
| 2nd | ○ |  |  |  | ○ | ○ |  | 2.717 | 1.358 |
| 3rd | ○ | ○ |  |  | ○ |  |  | 2.000 | 1.300 |
| 4th | ○ | ○ |  | ○ |  |  |  | 1.538 | 1.271 |
| 5th | ○ |  | ○ | ○ |  |  |  | 1.211 | 1.211 |
| 6th | ○ | ○ | ○ |  |  |  |  | 1.000 | 1.204 |
| 7th-1 |  | ○ | ○ | ○ |  |  |  | 0.831 | 1.288 |
| (8th) |  |  | ○ |  |  | ○ |  | 0.645 | SPREAD 6.231 |
| R1 |  | ○ |  |  | ○ |  | ○ | 3.636 | |
| R2 |  | ○ |  | ○ |  |  | ○ | 2.797 | |

SHIFT CONTROL APPARATUS FOR STEP-VARIABLE AUTOMATIC TRANSMISSION

This application is based on Japanese Patent Application No. 2003-346268 filed Oct. 3, 2003, the contents of which are incorporated hereinto by reference.

BACKGROUND OF THE INVENTION

1. Field of the Invention

The present invention relates in general to a shift control apparatus for a vehicle step-variable automatic transmission having a plurality of selectable groups of forward-drive positions having respective different sets of speed ratios, and more particularly to techniques associated with the shift control apparatus, for improving the drivability of a vehicle by suitably selecting one of the groups of forward-drive positions of the automatic transmission upon switching of its shifting mode from an automatic shifting mode to a manual shifting mode.

2. Discussion of Related Art

A known shift control apparatus for a vehicle step-variable automatic transmission has a so-called normal shifting pattern suitable in a normal drive mode of a motor vehicle, wherein the automatic transmission is shifted to one of a plurality of selectable operating positions, according to a predetermined relationship between a running speed of the vehicle and an opening angle of a throttle valve of an engine of the vehicle, which relationship is determined for a normal or ordinary running condition of the vehicle. Where the shift control apparatus has only the normal shifting pattern, the shift control apparatus may not intricately deal with different specific running conditions of the vehicle. In view of this drawback, JP-59-50261A proposes a shift control apparatus having shifting patterns other than the normal shifting pattern, such as a so-called power-drive shifting pattern selected in a power-drive mode for higher drivability of the vehicle than in the normal drive mode, and a so-called economy-drive shifting pattern selected in an economy-drive mode for higher fuel economy of the vehicle than in the normal drive mode. According to this shift control apparatus, an appropriate one of the different shifting patterns is selected to shift the automatic transmission, on the basis of a change in the opening angle of the throttle valve, so that the automatic transmission can be intricately controlled according to the shifting pattern that suits the specific running condition of the vehicle. However, the different shifting patterns merely have different shifting points (different combinations of running speed and throttle valve opening angle) at which shift-up and shift-down actions of the automatic transmission take place, so that the freedom or flexibility of shifting of the automatic transmission is lower than in a manual transmission which is shifted as desired by the operator of the vehicle.

In view of the drawback of the shift control apparatus disclosed in JP-59-50261A, JP-5-65953A discloses a shift control apparatus including a manually operable shifting device (shift-lever device) having not only an auto-shift position (D) for an automatic shifting mode in which the automatic transmission is automatically shifted to a selected one of a plurality of operating positions, but also a manual-shift position for a manual shifting mode in which the automatic transmission is manually shifted by the vehicle operator. In the manual-shift position, the operator can select one of different shifting patterns corresponding to respective groups of operating positions that are different from a group of operating positions available in the auto-shift position (D). In the manual shifting mode selected when the manually operable shifting device is placed in the manual-shift position, the automatic transmission can be manually shifted by the vehicle operator to a selected one of the operating positions of the selected shifting pattern. The operating position selected in the manual shifting mode may have a higher speed ratio than the corresponding operating position in the automatic shifting mode, for a higher value of acceleration or drivability of the vehicle as desired by the vehicle operator.

However, the shift control apparatus disclosed in JP-5-65953A suffers from an undesirable change in the speed ratio of the automatic transmission upon switching of its shifting mode from the automatic shifting mode to the manual shifting mode. Namely, since the speed ratios of the operating positions selectable in the manual shifting mode are different from those selectable in the automatic shifting mode, the speed ratio of the operating position selected upon switching to the manual shifting mode is different from that of the operating position selected last in the automatic shifting mode. Further, the above-identified publication discloses only one group of operating positions having a single set of speed ratios available in the automatic shifting mode, and does not disclose selection of one of a plurality of groups of operating positions having respective different sets of speed ratios, in the manual shifting mode, where a plurality of groups of operating positions are also available in the automatic shifting mode. That is, where the two or more groups of operating positions having respective different sets of speed ratios are available in the automatic shift mode, the set of speed ratios of the group of operating positions selected in the manual shifting mode upon switching of the shift mode from the automatic shifting mode to the manual shifting mode may be different from the set of speed ratios of the group of operating positions selected last in the automatic shifting mode. In this case, the switching of the shifting mode causes an undesirable change in the speed ratio of the automatic transmission.

SUMMARY OF THE INVENTION

The present invention was made in view of the background discussed above. It is therefore an object of the present invention to provide a shift control apparatus for a step-variable automatic transmission for a vehicle wherein the automatic transmission has a plurality of selectable groups of forward-drive positions having respective different sets of speed ratios and is controllable in a selected one of an automatic shifting mode and a manual shifting mode, the shift control apparatus being arranged to improve the drivability of the vehicle by suitably selecting one of the groups of forward-drive positions of the automatic transmission upon switching of its shifting mode from the automatic shifting mode to the manual shifting mode.

The object indicated above may be achieved according to the principle of this invention, which provides a shift control apparatus for controlling shifting actions of a step-variable automatic transmission having a plurality of selectable groups of forward-drive positions having respective different sets of speed ratios, the automatic transmission having an automatic shifting mode in which the shifting actions take place automatically, and a manual shifting mode in which the shifting actions are manually controllable, the shift control apparatus comprising a drive-position-group selecting portion operable upon switching of a shifting mode of the automatic transmission from the automatic shifting mode to the manual shifting mode, to select one of the plurality of selectable groups of forward-drive positions in the manual shifting mode, on the basis of the group which was selected last in the automatic shifting mode.

In the shift control apparatus constructed according to the principle of the present invention, the drive-position-group selecting portion is arranged to select one of the selectable groups of forward-drive positions in the manual shifting mode, on the basis of the group selected last in the automatic shifting mode by the drive-position-group selecting portion. This arrangement of the drive-position-group selecting portion permits adequate selection of an appropriate one of the selectable groups of forward-drive positions in the manual shifting mode, upon switching of the shifting mode of the automatic transmission from the automatic shifting mode to the manual shifting mode, so that the drivability of the vehicle can be improved.

According to a first preferred form of the present invention, the drive-position-group selecting portion is operable to select, in the manual shifting mode, one of the plurality of selectable groups of forward-drive positions which was selected immediately before a moment of the shifting of the shifting mode from the automatic shifting mode to the manual shifting mode.

In the shift control apparatus according to the first preferred form of the invention, the drive-position-group selecting portion is arranged to select the group of forward-drive positions which is the group selected last in the automatic shifting mode, that is, the group selected immediately before the moment of the shifting of the shifting mode from the automatic shifting mode to the manual shifting mode.

According to a second preferred form of the present invention, each of the plurality of selectable groups of forward-drive positions includes at least one forward-drive position each having a speed ratio which is different from that of a corresponding one of the forward-drive positions of the other of the selectable groups.

In the shift control apparatus according to the second preferred form of the invention, the set of speed ratios of the forward-drive positions of each of the plurality of selectable groups is determined so as to be suitable for a specific running condition of a vehicle on which the automatic transmission is installed, or for a specific mode of driving of the vehicle desired by the vehicle operator. For example, the selectable groups of forward-drive positions include a narrow-spread group of forward-drive positions which has a relatively narrow overall range or "spread" of speed ratio and which is suitable for a sporty or powerful running of the vehicle, and a wide-spread group of forward-drive positions which has a relatively wide overall range or "spread" of speed ratio and which is suitable for an economical running of the vehicle.

According to a third preferred form of the present invention, the plurality of selectable groups of forward-drive positions have respective different numbers of the forward-drive positions.

In the shift control apparatus according to the third preferred form of the invention, the number of the forward-drive positions of each group is determined so as to be suitable for a specific running condition of the vehicle or a specific mode of driving of the vehicle desired by the vehicle operator. For instance, the selectable groups of forward-drive positions include a group which has a relatively small number of forward-drive positions and which is suitable to prevent frequent shifting actions of the automatic transmission, which would take place when the operating amount of an accelerator pedal of the vehicle or the running speed of the vehicle is alternately increased and reduced frequently while the vehicle is running at a relatively low speed in an urban area. The selectable groups may further include a group which has a relatively large number of forward-drive positions and which permits a comparatively smooth or gradual shifting of the automatic transmission while the vehicle is running in a steady state with the operating amount of the accelerator pedal kept relatively constant.

According to a fourth preferred form of this invention, the shift control apparatus further comprises a manually operable shifting device manually operable to select one of the forward-drive positions of one of the plurality of selectable groups of the automatic transmission which has been selected by the drive-position-group selecting portion, and the automatic transmission is manually controllable in the manual shifting mode by a manual operation of the manually operable shifting device.

According to a fifth preferred form of this invention, the shift control apparatus further comprises a manually operable shifting device manually operable to select one of a plurality of ranges in which the automatic transmission is automatically shiftable to a selected one of the successive forward-drive positions of one of the plurality of selectable groups of the automatic transmission which has been selected by the drive-position-group selecting portion, the plurality of ranges having respective different numbers of the successive forward-drive positions, and wherein the automatic transmission is manually controllable in the manual shifting mode by a manual operation of the manually operable shifting device.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which:

FIG. 13A is a view showing an example of a manually operable shifting device provided on the vehicle;

FIG. 13A', FIG. 13B and FIG. 13C are views showing other examples of the manually operable shifting device;

FIG. 14 is a view indicating the forward-drive positions of the normal-spread and narrow-spread groups of the automatic transmission of the first embodiment, and of the normal-spread and wide-spread groups of the automatic transmission of the second embodiment, which forward-drive positions are available when the manually operable shifting device is placed in each of its operating positions;

FIG. 32 is a view indicating the forward-drive positions of the normal-spread and narrow-spread groups of the automatic transmission of FIG. 27, which forward-drive positions are available when the manually operable shifting device is placed in each of its operating positions;

DETAILED DESCRIPTION OF THE PREFERRED EMBODIMENTS

Figure 1:
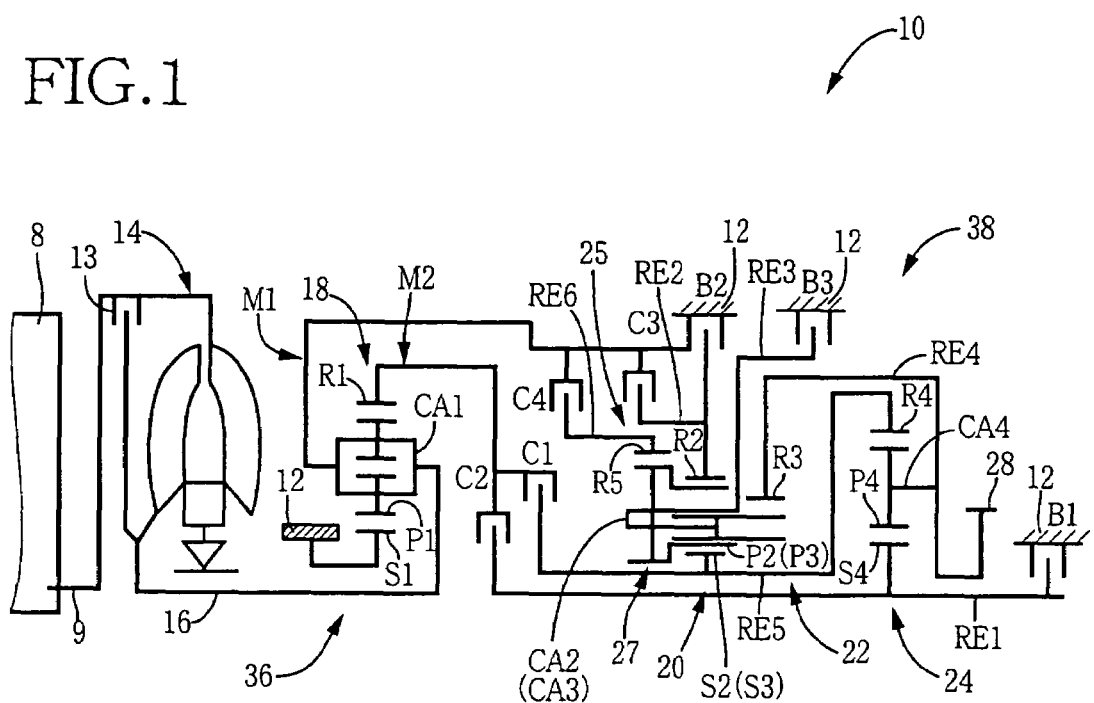
FIG. 1 is a schematic view illustrating a basic arrangement of a planetary gear type multiple-step automatic transmission for a vehicle, which is constructed according to a first embodiment of the present invention.

Referring to first to the schematic view of FIG. 1, there is illustrated a basic arrangement of a step-variable automatic transmission in the form of a planetary gear type multiple-step automatic transmission 10 for a motor vehicle, which is constructed according to the first embodiment of this invention. The automatic transmission 10 (hereinafter referred to simply as "transmission 10") has a plurality of operating positions which are selectively established, so that the speed ratio of the transmission 10 is changeable in steps. As shown in FIG. 1, the transmission 10 includes a fluid-operated power transmitting device in the form of a torque converter 14 with a lock-up clutch 13 incorporated therein, an input shaft 16 connected to the torque converter 14, a first shifting portion 36, a second shifting portion 38, and an output gear 28, which are disposed coaxially with each other, within a transmission casing 12 attached to the body of the vehicle. The first shifting portion 36 is constituted principally by a first planetary gear set 18, while the second shifting portion 38 is constituted principally by a second planetary gear set 20, a third planetary gear set 22, a fourth planetary gear set 24 and a fifth planetary gear set 25. The present transmission 10 is arranged to be suitably used for a longitudinal front-engine rear-drive vehicle (FR vehicle) or a transverse front-engine front drive vehicle (FF vehicle), and is interposed between a drive power source in the form of an engine 8, for example, and drive wheels of the vehicle, such that an output of the engine 8 is transmitted to the drive wheels through the transmission 10. In the present embodiment, the input shaft 16 and output gear 28 serve as an input member and an output member of the transmission 10, respectively, while the transmission casing 12 serves as a non-rotatable or stationary member. The torque converter 14 is operatively connected to a crankshaft 9 of the engine 8, so that the output of the engine 8 is transmitted to the input shaft 16 through the torque converter 14. Described in detail, the input shaft 16 is connected to a rotary output member of the torque converter 14 in the form of a turbine shaft which is rotated by the engine 8. Thus, the turbine shaft also serves as the input rotary member of the transmission 10. The output gear 28 is operatively connected to the right and left drive wheels through a differential gear device. Since the transmission 10 is constructed symmetrically with respect to its axis, the lower half of the transmission 10 located below the axis is omitted in the schematic view of FIG. 1. This omission also applies to automatic transmissions according to the other embodiments which will be described.

The first planetary gear set 18 of the first shifting portion 36 is a planetary gear device of a double-pinion type having a first sun gear S1, a plurality of pairs of first planetary gears P1 meshing with each other, a first carrier CA1 supporting the first planetary gears P1 such that each first planetary gear P1 is rotatable about its axis and rotatable about the axis of the first sun gear S1, and a first ring gear R1 meshing with the first sun gear S1 through the first planetary gears P1. The first planetary gear set 18 has a gear ratio $\rho1$ of about 0.427, for example. The first shifting portion 36 transmits a rotary motion of the input rotary member in the form of the input shaft 16 to the second shifting portion 38 through two output paths in the form of a first intermediate output path M1, and a second intermediate output path M2 a rotating speed of which is reduced with respect to that of the first intermediate output path M1. The first carrier CA1 functions as a first intermediate output member of the first shifting portion 36, and is connected to the input shaft 16 and the first intermediate output path M1. The first sun gear S1 is fixed to the transmission casing 12 and is not rotatable. The first ring gear R1 functions as a second intermediate output member of the first shifting portion 36, and is connected to the second intermediate output path M2. Although the first shifting portion 36 in the present first embodiment is arranged such that the first intermediate output path M1 is connected to the input shaft 16 and is rotated with the input shaft 16, the first intermediate output path M1 need not be connected to the input shaft 16.

The second planetary gear set 20 and the fourth planetary gear set 24 of the second shifting portion 38 are planetary gear devices of a single-pinion type, while the third planetary gear set 22 of the second shifting portion 38 is a planetary gear device of a double-pinion type. The second planetary gear set 20 has a second sun gear S2, a second planetary gear P2, a second carrier CA2 supporting the second planetary gear P2 such that the second planetary gear P2 is rotatable about its axis and rotatable about the axis of the second sun gear S2, and a second ring gear R2 meshing with the second sun gear S2 through the second planetary gear P2. The second planetary gear set 20 has a gear ratio of $\rho2$ of about 0.349, for example. The third planetary gear set 22 has a third sun gear S3, a plurality of pairs of third planetary gears P3 meshing with each other, a third carrier CA3 supporting the third planetary gears P3 such that each third planetary gear P3 is rotatable about its axis and rotatable about the axis of the third sun gear S3, and a third ring gear R3 meshing with the third sun gear S3 through the third planetary gears P3. The third planetary gear set 22 has a gear ratio $\rho3$ of about 0.419, for example. The fourth planetary gear set 24 has a fourth sun gear S4, a fourth planetary gear P4, a fourth carrier CA4 supporting the fourth planetary gear P4 such that the fourth planetary gear P4 is rotatable about its axis and rotatable about the axis of the fourth sun gear S4, and a fourth ring gear R4 meshing with the fourth sun gear S4 through the fourth planetary gear P4. The fourth planetary gear set 24 has a gear ratio $\rho4$ of about 0.301, for example. The second planetary gear P2 is a stepped pinion which includes a small-diameter gear portion meshing with the second sun gear S2 and the second ring gear R2, and a large-diameter gear portion 27 that meshes with a fifth ring gear R5 of the fifth planetary gear set 25. The fifth planetary gear set 25 has a gear ratio $\rho5$ of about 0.262, for example. However, the second planetary gear P2 may be a non-stepped pinion having only the gear portion 27 functioning as a fifth planetary gear P5 of the fifth planetary gear set 25. In this modified arrangement of the second shifting portion 38, the fifth planetary gear set 25 has a fifth sun gear S5, the above-indicated fifth planetary gear P5, a fifth carrier CA5 supporting the fifth planetary gar P5 such that the fifth planetary gear P3 is rotatable about its axis and rotatable about the axis of the fifth sun gear S5, and a fifth ring gear R5 meshing with the fifth sun gear S5 through the fifth planetary gear P5. Where the numbers of teeth of the first sun gear S1, first ring gear R1, second sun gear S2, second ring gear R2, third sun gear S3, third ring gear R3, fourth sun gear S4, fourth ring gear R4, fifth sun gear S5 and fifth ring gear R5 are represented by $Z_{S1}$, $Z_{R1}$, $Z_{S2}$, $Z_{R2}$, $Z_{S3}$, $Z_{R3}$, $Z_{S4}$, $Z_{R4}$, $Z_{S5}$ and $Z_{R5}$, respectively, the above-indicated gear ratios $\rho1$, $\rho2$, $\rho3$, $\rho4$ and 5 are represented by $Z_{S1}/Z_{R1}$, $Z_{S2}/Z_{R2}$, $Z_{S3}/Z_{R3}$, $Z_{S4}/Z_{R4}$, and $Z_{S5}/Z_{R5}$, respectively.

The second and third planetary gear sets 20, 22 are arranged such that the second carrier CA2 and the third carrier CA3 are constituted by a single common component, and the second sun gear S3 and the third sun gear S3 are constituted by a single common component, while the second planetary gear P2 also functions as one of the two meshing third planetary gears P3. Each of the single common components indicated above may be two separate components.

In the second shifting portion 38, the fourth sun gear S4 is selectively connected through a second clutch C2 to the second intermediate output path M2, that is, to the first ring gear R1 functioning as the second intermediate output member, and is selectively fixed by a first brake B1 to the transmission casing 12 serving as the non-rotatable or stationary member. The second ring gear R2 is selectively connected by a third clutch C3 to the first intermediate output path M1, that is, to the first carrier CA1 functioning as the first intermediate output member, and is selectively fixed by a second brake B2 to the transmission casing 12. The second and third carriers CA2, CA3 integrally connected to each other are selectively fixed by a third brake B3 to the transmission casing 12, and the third ring gear R3 and fourth carrier CA4 integrally connected to each other are connected to the output rotary member in the form of the output gear 28. The second and third sun gears S2, S3 and fourth ring gear R4 that are integrally connected to each other are selectively connected through a first clutch C1 to the first ring gear R1 functioning as the second intermediate output member, and the fifth ring gear R5 is selectively connected through a fourth clutch C4 to the first carrier CA1 functioning as the first intermediate output member.

The first, second, third and fourth clutches C1-C4 and the first, second and third brakes B1-B3 are all hydraulically operated frictional coupling devices widely used in known step-variable automatic transmissions, multiple-disc type frictional coupling devices. For instance, each of those clutches may be a wet-type multiple-disc clutch having a plurality of friction plates which are superposed on each other and forced against each other by a hydraulic actuator, each of those brakes may be a band brake having one band or two bands each of which is wound on the outer circumferential surface of a rotary drum and tightened at its one end by a hydraulic actuator. The brakes B1-B3 are selectively engaged to fix the corresponding rotary elements to the transmission casing 12.

Figures 2, 3:
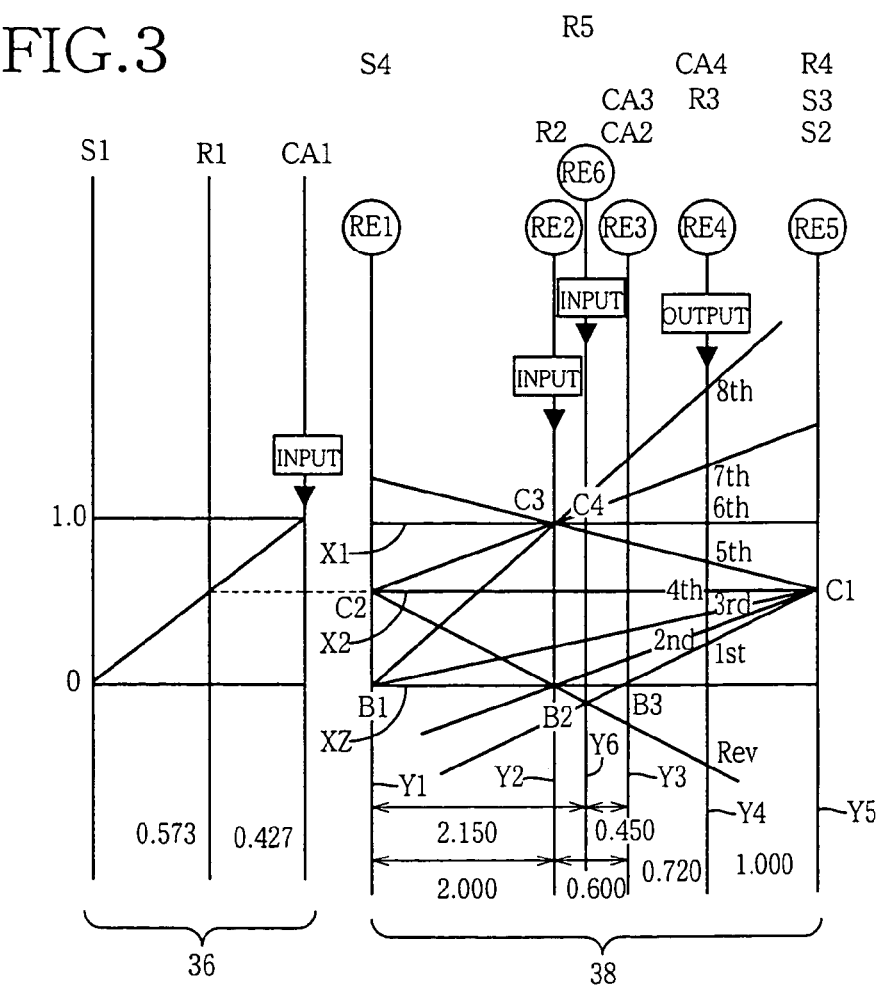
FIG. 2 is a view indicating a relationship between the operating positions of the automatic transmission of FIG. 1 and respective combinations of operating states of hydraulically operated frictional coupling devices, when a normal-spread group of operating positions is selected.
FIG. 3 is a collinear chart showing an operation of the automatic transmission of FIG. 1 when the normal-spread group of operating positions is selected.

In the transmission 10 constructed as described above, a selected one of eight forward-drive positions and a rear-drive position (Rev) is established by simultaneous engaging actions of a corresponding combination of two frictional coupling devices selected from the first through fourth clutches C1-C4 and first, second and third brakes B1-B3, as shown in FIG. 2. The seven forward-drive positions consist of a first-speed position (1st), a second-speed position (2nd), a third-speed position (3rd), a fourth-speed position (4th), a fifth-speed position (5th), a sixth-speed position (6th), a seventh-speed position (7th) and an eighth-speed position (8th), which have respective speed ratios $\gamma 1$-$\gamma 8$ that change as geometric series. The gear ratio $\gamma$ is equal to $N_{IN}/N_{OUT}$, where $N_{IN}$ and $N_{OUT}$ represent rotating speeds of the input shaft 16 and the output gear 28, respectively.

As shown in FIG. 2, the first-speed position (1st) having the highest speed ratio $\gamma 1$ of about 4.169, for example, is established by engaging actions of the first clutch C1 and the third brake B3. The second-speed position (2nd) having the speed ratio $\gamma 2$ of about 3.067, for example, which is lower than that of the first-speed position, is established by engaging actions of the first clutch C1 and the second brake B2. The third-speed position (3rd) having the speed ratio $\gamma 3$ of about 2.271, for example, which is lower than that of the second-speed position, is established by engaging actions of the first clutch C1 and the first brake B1. The fourth-speed position (4th) having the speed ratio $\gamma 4$ of about 1.745, for example, which is lower than that of the third-speed position, is established by engaging actions of the first and second clutches C1 and C2. The fifth-speed position (5th) having the speed ratio $\gamma 5$ of about 1.321, for example, which is lower than that of the fourth-speed position, is established by engaging actions of the first and third clutches C1 and C3. The sixth-speed position (6th) having the speed ratio $\gamma 6$ of about 1.000, for example, which is lower than that of the fifth-speed position, is established by engaging actions of the third and fourth clutches C3 and C4. The seventh-speed position (7th) having the speed ratio $\gamma 7$ of about 0.780, for example, which is lower than that of the sixth-speed position, is established by engaging actions of the second and third clutches C2 and C3. The eighth-speed position (8th) having the speed ratio $\gamma 8$ of about 0.602, for example, which is lower than that of the seventh-speed position, is established by engaging actions of the third clutch C3 and the first brake B1.

The rear-drive position having a speed ratio $\gamma_R$ of 2.644, for example, which is intermediate between those of the second- and third-speed positions, is established by engaging actions of the second clutch C2 and the second brake B2. The first-speed through eighth-speed positions (1st through 8th) indicated in FIG. 2 constitute a normal-spread group of forward-drive positions having a set of speed ratios $\gamma 1$-$\gamma 8$. The speed ratios $\rho 1$-$\rho 5$ of the first through fifth planetary gear sets 18, 20, 22, 24, 25 are determined to establish the above-indicated speed ratios $\gamma 1$-$\gamma 8$ and $\gamma_R$ of the nine operating positions (1st trough 8th, and Rev).

In the specific example of FIG. 2, stepping ratios of the adjacent forward-drive positions of the normal-spread group of the transmission 10, and an overall speed ratio range ("spread") of the normal-spread group of eight forward-drive positions are determined as described below. Namely, the stepping ratio ($\gamma 1/\gamma 2$) which is a ratio of the speed ratio $\gamma 1$ of the first-speed position to the speed ratio $\gamma 2$ of the second-speed position is 1.359, and the stepping ratio ($\gamma 2/\gamma 3$) which is a ratio of the speed ratio $\gamma 2$ of the second-speed position to the speed ratio $\gamma 3$ of the third-speed position is 1.351. The stepping ratio ($\gamma 3/\gamma 4$) which is a ratio of the speed ratio $\gamma 3$ of the third-speed position to the speed ratio $\gamma 4$ of the fourth-speed position is 1.301. The stepping ratio ($\gamma 4/\gamma 5$) which is a ratio of the speed ratio $\gamma 4$ of the fourth-speed position to the speed ratio $\gamma 5$ of the fifth-speed position is 1.321. The stepping ratio ($\gamma 5/\gamma 6$) which is a ratio of the speed ratio $\gamma 5$ of the fifth-speed position to the speed ratio $\gamma 6$ of the sixth-speed position is also 1.321. The stepping ratio ($\gamma 6/\gamma 7$) which is a ratio of the speed ratio $\gamma 6$ of the sixth-speed position to the speed ratio $\gamma 7$ of the seventh-speed position is 1.282, and the stepping ratio ($\gamma 7/\gamma 8$) which is a ratio of the speed ratio $\gamma 7$ of the seventh-speed position to the speed ratio $\gamma 8$ of the eighth-speed position is 1.295. Thus, the speed ratios $\gamma 1$-$\gamma 8$ change as the geometric series. As described above, the overall speed ratio range or "spread"=$\gamma 1/\gamma 8$=4.169/0.602) of the normal-spread group of eight forward-drive positions is as wide as about 6.921.

The collinear chart of FIG. 3 indicates, by straight lines, a relationship among the rotating speeds of the rotary elements the rotary elements of the first and second shifting portions 36, 38 when the transmission 10 is placed in each of its operating positions. The collinear chart of FIG. 3 is a two-dimensional coordinate system which has a horizontal axis and a vertical axis and in which the gear ratios $\rho 1$-$\rho 5$ of the first through fifth planetary gear sets 18, 20, 22, 24, 25 are taken along the horizontal axis, while the relative rotating speeds of the rotary elements are taken along the vertical axis. A lowermost one of three horizontal straight lines X1, X2, XZ, that is, the horizontal straight line XZ indicates the rotating speed of "0", while an uppermost one of the three horizontal lines X1, X2, XZ, that is, the horizontal straight line X1 indicates the rotating speed corresponding to the speed ratio of 1.0, that is, the rotating speed of the first intermediate output path M1. The intermediate horizontal straight line X2 between the two horizontal straight lines X1, XZ indicates the rotating speed N×2 of the second intermediate output path M2, which is lower than the rotating speed of the first intermediate output path M1 by an amount corresponding to the gear ratio $\rho 1$ of the first planetary gear set 18. First three vertical straight lines as counted from the left end of the collinear chart of FIG. 3 correspond to the first sun gear S1, first ring gear R1 and first carrier CA1 of the first planetary gear set 18 of the first shifting portion 36, respectively, and the distances between the adjacent ones of those three vertical straight lines are determined by the gear ratio ρ1 of the first planetary gear set 18. Six vertical straight lines Y1-Y6 on the right side of the above-indicated three vertical straight lines respectively correspond to a first rotary element RE1 in the form of the fourth sun gear S4, a second rotary element RE2 in the form of the second ring gear R2, a third rotary element RE3 in the form of the second and third carriers CA2 and CA3 connected to each other, a fourth rotary element RE4 in the form of the third ring gear R3 and fourth carrier CA4 connected to each other, a fifth rotary element RE5 in the form of the second and third sun gears S2, S3 and fourth ring gear R4 connected to each other, and a sixth rotary element RE6 in the form of the fifth ring gear R5. The vertical straight line Y6 is located between the vertical straight lines Y2 and Y3. The distances between the adjacent ones of the vertical straight lines Y1-Y6 are determined by the gear ratios ρ2-ρ5 of the second, third, fourth and fifth planetary gear sets 20, 22, 24, 25. In general, the distance between the vertical straight line for each sun gear and the vertical straight line for the corresponding carrier corresponds to "1", while the distance between the vertical straight line for each carrier and the vertical straight line for the corresponding ring gear corresponds to the corresponding gear ratio ρ. In the collinear chart of FIG. 3, the distance between the vertical straight lines Y4 and Y5 corresponds to "1", while the distances between the other adjacent vertical straight lines Y1-Y4, Y6 (Y1 and Y2; Y2 and Y6; Y6 and Y3; and Y3 and Y4) are determined on the basis of the distance between the vertical straight lines Y4 and Y5 and the gear ratios ρ2-ρ5.

Referring to the collinear chart of FIG. 3, the arrangement of the present transmission 10 will be described in further detail. In the first shifting portion 36, the first carrier CA1 which is one of the three rotary elements of the first planetary gear set 18 is connected to the input shaft 16 (input rotary member) and the first intermediate output path M1, and the first sun gear S1 which is another of the three rotary elements is non-rotatably fixed to the transmission casing 12 (non-rotatable member), while the first ring gear R1 which is the third rotary element is connected to the second intermediate output path M2, so that the rotary motion of the input shaft 16 is transmitted to the second shifting portion 38 through the first intermediate output path M1, and the second intermediate output path M2 the rotating speed of which is reduced with respect to that of the first intermediate output path M1. In the second shifting portion 38, the first rotary element RE1 in the form of the fourth sun gear S4 is selectively connected through the second clutch C2 to the first ring gear R1 (second intermediate output path M2), and is selectively fixed by the first brake B1 to the transmission casing 12, and the second rotary element RE2 in the form of the second ring gear R2 is selectively connected through the third clutch C3 to the first carrier CA1 (first intermediate output path M1), and is selectively fixed by the brake B2 to the transmission casing 12. The third rotary element RE3 in the form of the second and third carriers CA2, CA3 is selectively fixed by the third brake B3 to the transmission casing 12, and the fourth rotary element RE4 in the form of the third ring gear R3 and the fourth carrier CA4 is connected to the output gear 28. The fifth rotary element RE5 in the form of the second and third sun gears S2, S3 and fourth ring gear R4 is selectively connected through the first clutch C1 to the first ring gear R1, and the sixth rotary element RE6 in the form of the fifth ring gear R5 is selectively connected through the fourth clutch C4 to the first carrier CA1.

As is apparent from the collinear chart of FIG. 3, a selected one of the nine operating positions (1st through 8th and Rev) of the transmission 10 is established by simultaneous engaging actions of the corresponding combination of two frictional coupling devices selected from among the first clutch C1, second clutch C2, third clutch C3, fourth clutch C4, first brake B1, second brake B2 and third brake B3, so that the corresponding rotary elements selected from the first through sixth rotary elements RE1-RE6 are connected to the first intermediate output path M1, for rotation at a speed corresponding to the speed ratio of 1.0, or connected to the second intermediate output path M2, for rotation at the speed N×2, or fixed to the transmission casing 12 and held stationary. The rotating speeds of the output gear 28 when the transmission 10 is placed in the nine operating positions ($1^{st}$-speed through $8^{th}$-speed positions, and rear-drive position Rev) are indicated along the vertical straight line Y4. In the first-speed position, for example, the fifth rotary element RE5 is connected through the engaged first clutch C1 to the second intermediate output path M2, and is rotated at the speed N×2, while the third rotary element RE3 is fixed by the engaged third brake B3 to the transmission casing 12 and is held stationary. In this case, the rotating speed of the output gear 28 is represented by a point of intersection of the vertical straight line Y4 and an inclined straight line which connects a point of intersection (indicated at "1st" in FIG. 3) between the vertical straight line Y4 and the horizontal straight line X2 and a point of intersection between the vertical straight line Y3 and the horizontal straight line XZ.

Figures 4, 5:
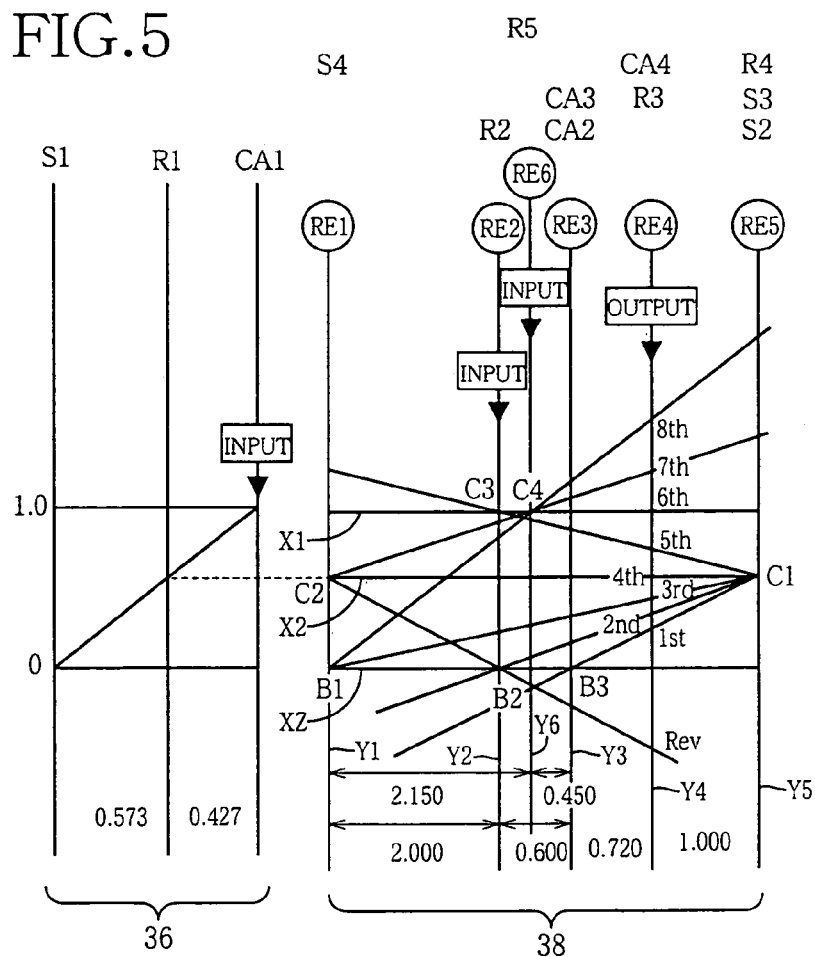
FIG. 4 is a view indicating a relationship between the operating positions of the automatic transmission of FIG. 1 and respective combinations of operating states of the hydraulically operated frictional coupling devices, when a narrow group of operating positions is selected.
FIG. 5 is a collinear chart showing an operation of the automatic transmission of FIG. 1 when the narrow-spread group of operating positions of the automatic transmission is selected.

As described above, the first-speed through eighth-speed positions (1st through 8th) indicated in FIG. 2 constitute the normal-spread group of forward-drive positions which has the set of speed ratios γ1-γ8 and a relatively wide overall speed ratio range or spread. Of the speed ratios of these eight forward-drive positions, the speed ratios γ7 and γ8 of the seventh-speed and eighth-speed positions ($7^{th}$ and 8th) are lower than 1.0. That is, the rotating speeds of the output gear 28 when the transmission 10 is placed in the seventh-speed and eighth-speed positions are higher than the rotating speed of the input shaft 16. These seventh-speed and eighth-speed positions are established by engaging the third clutch C3 as well as the second clutch C2 and the first brake B1, respectively. The present transmission 10 has a narrow-spread group of nine operating positions wherein the seventh-speed and eighth-speed positions "7th" and "8th" are established by engaging the fourth clutch C4 in place of the third clutch C3, as well as the second clutch C2 and the first brake B1, respectively, as indicated in FIGS. 4 and 5, so that the sixth rotary element RM6 is connected to the first intermediate output path M1, for rotation at the speed corresponding to the speed ratio of 1.0. The speed ratios of these seventh-speed and eighth-speed positions of the narrow-spread group of operating positions of FIG. 4, which are established by engaging the fourth clutch C4, are higher than those of the normal-spread group of operating positions of FIG. 2, which are established by engaging the third clutch C3, and are determined by the position of the sixth rotary element RM6 (ring gear R5) in the direction parallel to the horizontal axis of the collinear chart of FIG. 5. That is, the speed ratios of the seventh-speed and eighth-speed positions of the narrow-spread group are determined by a gear ratio ρ5 of the fifth planetary gear set 25.

The narrow-spread group of operating positions indicated in FIGS. 4 and 5 is different from the normal-spread group of operating positions indicated in FIGS. 2 and 3, only in the combinations of the two frictional coupling devices to be engaged to establish the seventh-speed and eighth-speed positions and in the speed ratios of these two forward-drive positions. Namely, the seventh-speed position having a speed ratio γ7 of about 0.811, for example, is established by engaging the fourth clutch C4 as well as the second clutch C2, and the eighth-speed position having a speed ratio γ8 of about 0.648 is established by engaging the clutch C4 as well as the first brake B1. Since the speed ratios γ7 and γ8 of the seventh-speed and eighth-speed positions of the narrow-spread group are higher than those of the normal-spread group, the overall speed ratio range or spread (=γ1/γ8=6.433) of the narrow-spread group is accordingly narrower than that (6.921) of the normal-spread group. Accordingly, the transmission 10 placed in the seventh-speed or eighth-speed position of the narrow-spread group provides a larger drive torque than in the corresponding position of the normal-spread group. Therefore, the seventh-speed and eighth-speed positions of the narrow-spread group of forward-drive positions can be effectively used where a relatively large vehicle drive force is required during running of the vehicle at a relatively high speed, for example, during a high-speed running on an uphill road, or for rapid acceleration of the vehicle. Thus, the transmission 10 has the normal-spread group of forward-drive positions of FIG. 2 and the narrow-spread group of forward-drive positions of FIG. 4.

Referring next to FIGS. 6-9, there will be described a second embodiment of this invention, which is a modification of the transmission 10 of the first embodiment of FIGS. 1-5.

The transmission 10 of the second embodiment is different from that of the first embodiment, only in that the fifth planetary gear set 25 has a gear ratio γρ5 of about 0.390 which is higher than that (0.262) in the first embodiment. The transmission 10 of the second embodiment has the normal-spread group of operating positions indicated in FIG. 6, which is the same as that of FIG. 2 of the first embodiment. Since the fifth planetary gear set 25 of the second shifting portion 38 has the gear ratio ρ5 of about 0.390, the vertical straight line Y6 corresponding to the sixth rotary element RE6 (fifth ring gear R5) is located between the vertical straight lines Y1 and Y2, as shown in the collinear chart of FIG. 7.

Figures 8, 9:
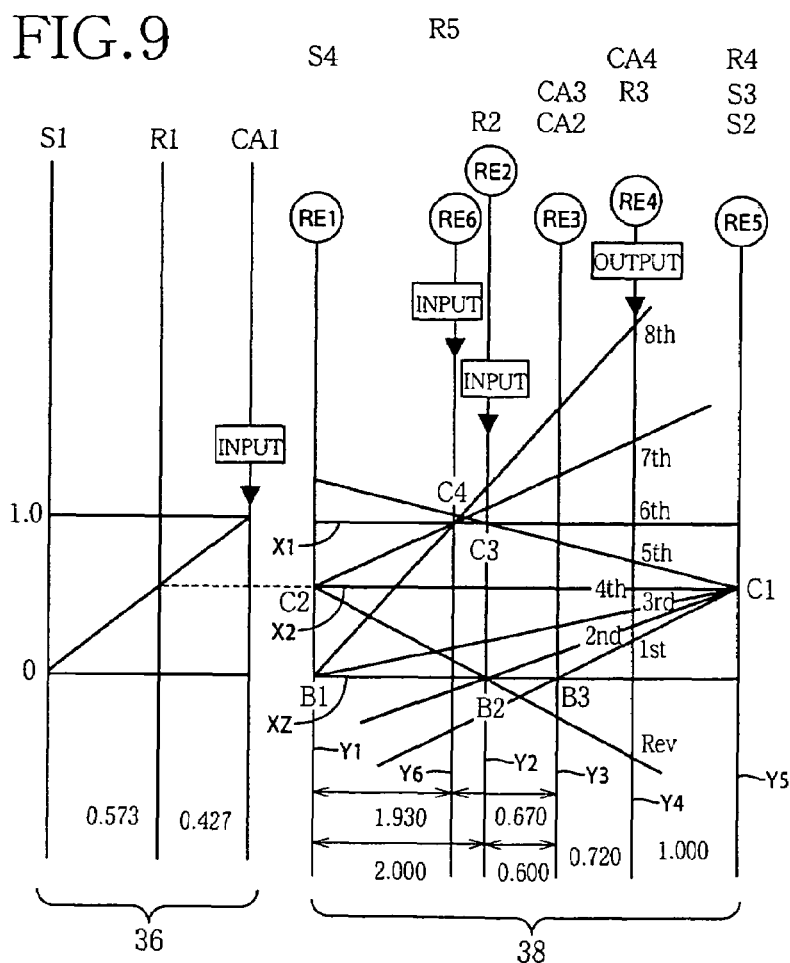
FIG. 8 is a view indicating a relationship between the operating positions of the automatic transmission of the second embodiment, and respective combinations of operating states of the frictional coupling devices, when a wide-spread group of operating positions is selected.
FIG. 9 is a collinear chart showing an operation of the automatic transmission of the second embodiment when the wide-spread group of operating positions is selected.

The transmission 10 of the second embodiment has a wide-spread group of nine operating positions, which includes the seventh-speed position established by engaging the fourth clutch C4 as well as the second clutch C2, and the eighth-speed position established by engaging the fourth clutch C4 as well as the first brake B1, as indicated in FIGS. 8 and 9. The other positions of the wide-spread group of operating positions of FIG. 8 are established by the same combinations of the frictional coupling devices as those of the normal-spread group of FIG. 6. As indicated in FIG. 8, the seventh-speed position established by the engaging actions of the second and fourth clutches C2, C4 has a speed ratio of about 0.765, and the eighth-speed position established by the engaging actions of the fourth clutch and the first brake B1 has a speed ratio of about 0.581. These speed ratios of the seventh-speed and eighth-speed positions of the wide-spread group are lower than those of the normal-spread group of FIG. 6. Accordingly, the wide-spread group of FIG. 8 has a wide overall speed ratio range or spread of about 7.175 (γ1/γ8) than that (6.921) of the normal-spread group of FIG. 6. The seventh-speed and eighth-speed positions of the wide-spread group can be effectively used for steady or economical running of the vehicle at a relatively high speed. When the seventh-speed or eighth-speed is established by engaging the fourth clutch C4, as indicated in the collinear chart of FIG. 9, the sixth rotary element RE6 is connected to the first intermediate output path M1, as described above with respect to the narrow-spread group of FIG. 4 by reference to the collinear chart of FIG. 5. Thus, the second embodiment is arranged such that the transmission 10 has the normal-spread group of forward-drive positions of FIG. 6 and the wide-spread group of forward-drive positions of FIG. 8.

Figure 10:
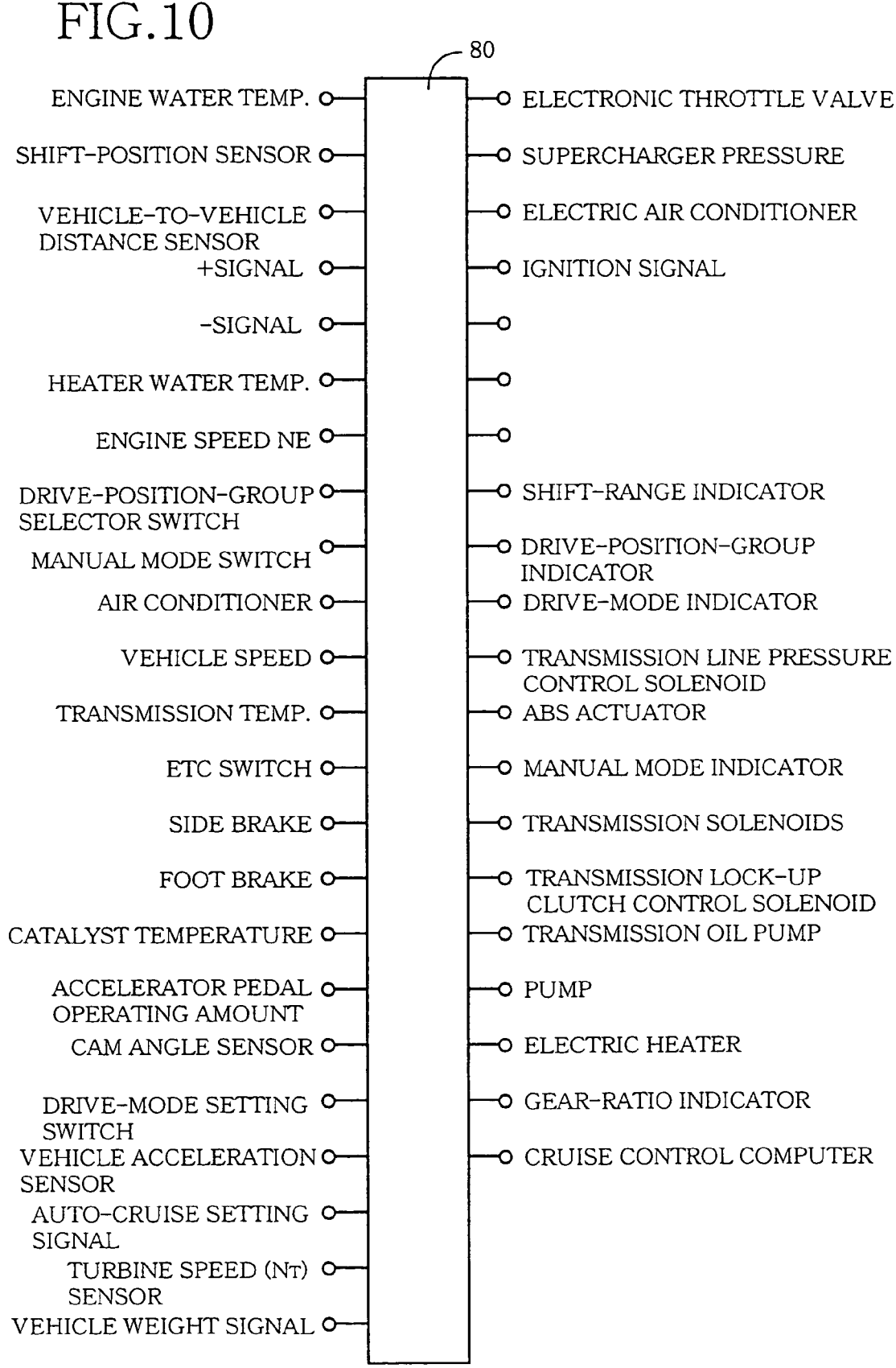
FIG. 10 is a block diagram illustrating inputs to and outputs from an electronic control device for the planetary gar type multiple-step automatic transmission of FIG. 1.

The automatic transmission 10 having the two groups of operating positions as described above is controlled by an electronic control device 80 which receives various input signals and generates various output signals, as illustrated in the block diagram of FIG. 10. The input signals include: a signal indicative of an operating amount Acc of an accelerator pedal detected by an accelerator sensor; a signal indicative of an opening angle $\theta_{TH}$ of the throttle valve detected by a throttle opening sensor; a signal indicative of the vehicle running speed V obtained from a rotating speed $N_{OUT}$ of the output gear 28 detected by an output speed sensor; a signal indicative of an operating speed NE of the engine 8 detected by an engine speed sensor; a signal indicative of a supercharger pressure Pa in an intake pipe of the engine 8; a signal indicative of a currently selected position $P_{SH}$ of a shift lever 92 (which will be described by reference to FIG. 13A); and a signal indicative of an oil temperature $T_{OIL}$ of the working fluid of the transmission 10. The output signals include: a drive signal for driving a throttle actuator for controlling the throttle valve to establish its opening angle $\theta_{TH}$ according to the operating amount Acc of the accelerator pedal; signals S1, S2 and S3 for controlling solenoid coils of shift valves incorporated in a hydraulic control circuit 88 (shown in the diagram of FIG. 15) to shift the transmission 10; a signal $D_{SLT}$ for driving a linear solenoid valve SLT for controlling the line pressure used to control the engaging and releasing actions of the frictional coupling devices; a signal $D_{SLU}$ for driving a linear solenoid valve SLU for controlling the engaging and releasing actions (amount of slipping) of the lock-up clutch 13; a signal $D_{SLN}$ for driving a linear solenoid valve SLN for controlling the back pressure of an accumulator provided in the hydraulic control circuit 88.

Figure 11:
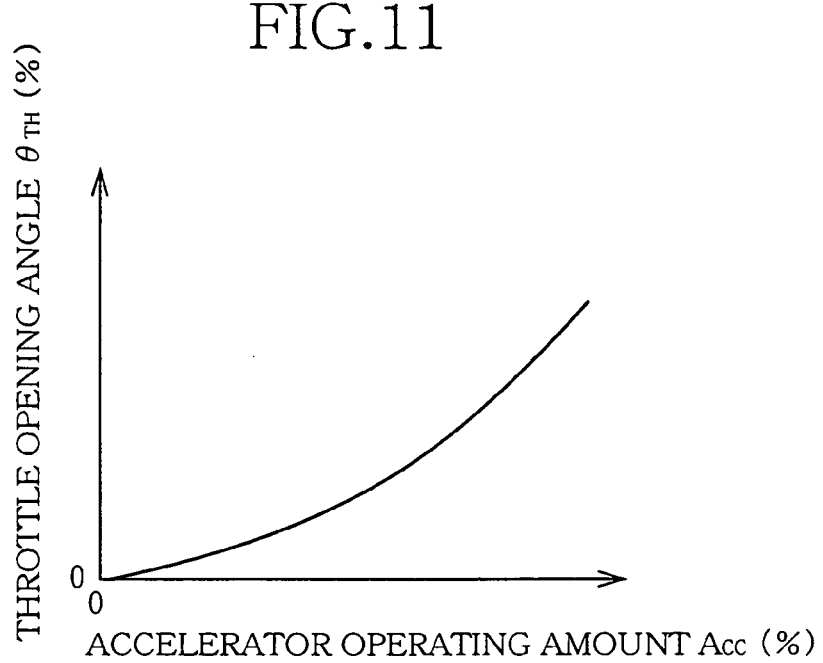
FIG. 11 is a graph indicating a relationship between an opening angle of a throttle valve controlled by the electronic control device of FIG. 10, and an operating amount of an accelerator pedal.
Figure 12:
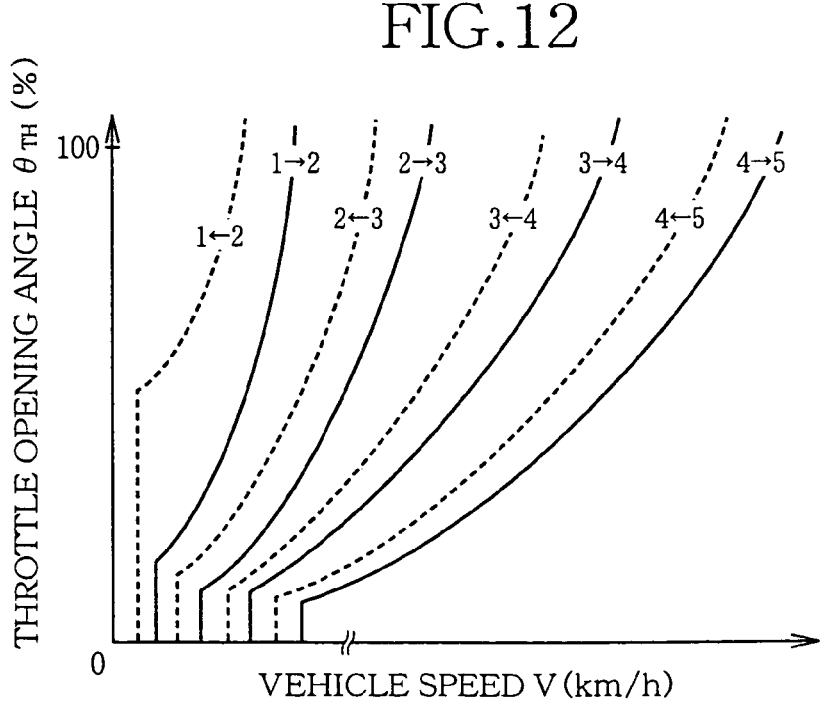
FIG. 12 is a graph indicating shift-up and shift-down boundary lines used by the electronic control device to shift the automatic transmission.

The electronic control device 80 is principally constituted by a microcomputer incorporating a central processing unit (CPU), a read-only memory (ROM), a random-access memory (RAM), and an input/output interface. The CPU operates according to control programs stored in the ROM, while utilizing a temporary data storage function of the RAM, to effect various control operations such as: a throttle control operation to control the opening angle $\theta_{TH}$(%) of the throttle valve; a shift control operation to shift the transmission 10 in an automatic shifting mode or a manual shifting mode; an engine output control operation to control the output of the engine 8; a lock-up clutch control operation to control the lock-up clutch 13; a supercharger pressure control operation to control the supercharger pressure of the engine 8; and an air/fuel ratio control operation to control the air/fuel ratio of the engine 8. The engine output control operation is effected by controlling a throttle actuator to control the opening angle of the throttle valve, a fuel injector valve to control the amount of fuel injection into the engine 8, and an igniter to control the ignition timing of the engine 8, for example. The throttle control operation is effected by controlling the throttle actuator to control the opening angle $\theta_{TH}$ (%) of the throttle valve, on the basis of the operating amount Acc (%) of the accelerator pedal, and according to a predetermined relationship between the throttle opening angle $\theta_{TH}$ (%) and the accelerator pedal operating amount Acc (%), such that the throttle opening angle increases with the accelerator pedal operating amount Acc, as indicated in the graph of FIG. 11 by way of example. This relationship is stored in the ROM. The shift control operation to control the transmission 10 is effected by selecting one of the operating positions of the transmission 10 on the basis of the detected actual accelerator pedal operating amount Acc (%) or throttle opening angle $\theta_{TH}$ (%) and the detected actual vehicle speed V (km/h), and according to predetermined shift-up and shift-down boundary lines (collectively referred to as "shifting pattern"), as indicated in the graph of FIG. 12 by way of example, and controlling the solenoid-operated valves of the hydraulic control circuit 88 to control the frictional coupling devices C1-C4 and B1-B3, so as to establish the selected operating position of the transmission 10 in the automatic shifting mode, or to shift up or down the transmission 10 according to the currently selected position $P_{SH}$ of the shift lever 92 in the manual shifting mode. In the example of FIG. 12, each of the shift-up and shift-down boundary lines (for the first-speed through fifth-speed positions of the eight forward-drive positions) represents a relationship between the throttle opening angle $\theta_{TH}$ (%) and the vehicle speed V. When a point defined by the presently detected throttle opening angle and vehicle speed moves from a point on one side of any shift-up or shift-down boundary line to a point on the other side of this boundary line, the transmission 10 is controlled to be shift up or down depending upon the boundary line in question.

FIG. 13A shows a manually operable shifting device 94 which includes the above-indicated shift lever 92 and which is provided adjacent to the vehicle operator's seat. The shift lever 92 is movable to a selected one of its operating positions consisting of: a parking position P in which the output gear 28 of the transmission 10 is locked; a reverse position R for driving the vehicle in the reverse direction with the transmission 10 placed in the rear-drive position (Rev); a neutral position N in which the transmission 10 is placed in its neutral state for inhibiting power transmission from the input shaft 16 to the output gear 28; an auto-shift position D for driving the vehicle in the forward direction with the transmission 10 placed in one of the forward-drive positions (first-speed position "1st" through the eighth-speed position "8th") which is selected in the automatic shifting mode; and a manual-shift position M for driving the vehicle in the forward direction with the transmission 10 shifted in the manual shifting mode. The parking and neutral positions P, N are non-drive positions in which the vehicle is not driven, and the reverse position R is a rear-drive position for driving the vehicle in the reverse direction, while the auto-shift and manual-shift positions D, M are forward-drive positions for driving the vehicle in the forward direction. As described below, the highest-speed position in the form of the eighth-speed position (8th) is selectable only when the shift lever 92 is placed in the auto-shift position D.

When the shift lever 92 is placed in the manual-shift position M, the shifting of the transmission 10 is controlled in one of two different manners which will be described. In the first manner, the number of the forward-drive positions selectable in the manual-shift position M can be changed in eight steps, depending upon a selected one of eight ranges D, 7, 6, 5, 4, 3, 2 and L which are electrically established. The table of FIG. 14 indicates the forward-drive positions of the normal-spread group, narrow-spread group and wide-spread group, which forward-drive positions are available in the eight ranges D through L that are selectively and electrically established by operating the shift lever 92, as described below. As described above, one of the normal-spread and narrow-spread groups is selected in the transmission 10 of the first embodiment of FIGS. 1-5, while one of the normal-spread and wide-spread groups is selected in the transmission 10 of the second embodiment of FIGS. 6-9. When the range D is electrically established, all of the eight forward-drive positions (first-speed through eighth-speed positions) of a selected one of the normal-spread, narrow-spread and wide-spread group are available, and the transmission 10 is automatically shiftable to any one of those eight forward-drive positions. When the range 7 is established, the first-speed through the seventh-speed positions are available, so that the transmission 10 is automatically shiftable to any one of those seven forward-drive positions. When the range L is established, only the first-speed position (1st) is available, so that the transmission 10 is automatically placed in this first-speed position. Thus, the number of the forward-speed positions available is reduced by changing the electrically established range from D toward L, such that the speed ratio of the highest-speed position is reduced as the number of the forward-speed positions available is reduced. Namely, the highest-speed position available is changed, for example, from the fifth-speed position (5th) to the fourth-speed position (4th) when the selected range is changed from the range 5 to the range 4. In the manually operable shifting device 94 shown in FIG. 13A, the manual-shift position M of the shift lever 92 is located at the same longitudinal position of the vehicle as the auto-shift position D and is spaced from the auto-shift position D in the lateral or transverse direction of the vehicle. By moving the shift leer 92 from the manual-shift position M to a shift-up position "+" or a shift-down position "−" in the longitudinal direction of the vehicle, one of the eight ranges D-L can be electrically selected or established. The shift lever 92 is biased by a suitable biasing means such as a spring to be normally held in the manual-shift position M, so that the shift lever 92 is automatically returned from the shift-up position "+" or shift-down position "−" to the manual-shift position M when a force acting on the shift lever 92 to hold it in the shift-up or shift-down position "+", "−" is removed by the vehicle operator. The electrically selected one of the ranges D through L is changed according to the number of successive movements of the shift lever 92 from the manual-shift position M to the shift-up position "+" or shift-down position "−", or the length of time for which the shift lever 92 is held in the shift-up or shift-down position "+", "−". The range initially selected when the shift lever 92 is moved to the manual-shift position M may be the range selected last while the shift lever 92 was placed in the auto-shift position D, that is, the range selected immediately before the shift lever 92 is moved from the auto-shift position D to the manual-shift position M. Alternatively, the initially selected range in the manual-shift position M may be the range which is next to the range selected last in the auto-shift position, as seen in the direction toward the range L. The range is changed one step from the initially selected range toward the range L each time the shift lever 92 is moved to the shift-down position "−", and toward the range D each time the shift lever 92 is moved to the shift-up position "+".

In the second manner of shifting control of the transmission 10 when the shift lever 92 is placed in the manual-shift position M, the transmission 10 is directly and manually shifted up or down from the currently selected forward-drive position (1st, 2nd, 3rd, 4th, 5th, 6th, 7th, or 8th) by moving the shift lever 92 from the manual-shift position M to the shift-up position "+" or shift-down position "−". For example, the transmission 10 is manually shifted up from the currently selected fourth-speed position (4th) to the fifth-speed position (5th) by moving the shift lever 92 from the manual-shift position M to the shift-up position "+", or from the currently selected fourth-speed position (4th) to the sixth-speed position (6th) by repeating the movement of the shift lever 92 from the manual-shift position M to the shift-up position "+" twice. As in the first manner described above, the forward-drive position is changed one step from the initially selected forward-drive position toward the first-speed position (1st) each time the shift lever 92 is moved to the shift-down position "−", and toward the eight-speed position (8th) each time the shift lever 92 is moved toward the shift-up position "+". The initially selected forward-drive position may be the position selected last while the shift lever 92 was placed in the auto-shift position D, or the position which is next to the position selected last in the automatic shifting mode, as seen in the direction toward the first-speed position.

The manually operable shifting device 94 is provided with a shift-position sensor 98 operable to detect the currently selected position $P_{SH}$ of the shift lever 92. The output signal of this shift-position sensor 98 indicative of the presently selected position $P_{SH}$ is applied to the electronic control device 80. The shifting device 94 is further provided with a shifting-pattern selecting device in the form of a drive-mode selector switch 96 having a NORMAL drive-mode position and a POWER drive-mode position. When the drive-mode selector switch 96 is placed in the NORMAL drive-mode position, the transmission 10 is automatically shifted up and down according to a normal-drive shifting pattern suitable for normal or ordinary running of the vehicle. When the selector switch 96 is placed in the POWER drive-mode position, the transmission 10 is automatically shifted up and down according to a power-drive shifting pattern suitable for sporty or powerful running of the vehicle. For example, the normal-drive shifting pattern consists of the shift-up and shift-down boundary lines FIG. 12, and the power-drive shifting pattern consist of shift-up and shift-down boundary lines which are shifted from those of FIG. 12 in the direction of increase of the vehicle speed V (km/h) as seen in FIG. 12, so that shift-up and shift-down actions of the transmission 10 when the throttle valve has a given opening angle $\theta_{TH}$ take place at higher vehicle speed V according to the shift-up and shift-down boundary lines of the power-drive shifting pattern than the shift-up and shift-down actions according to the boundary lines of the normal-drive shifting pattern of FIG. 12. Accordingly, the transmission 10 is placed in the relatively low-speed forward-drive positions at the relatively high vehicle speed, when the drive-mode selector switch 96 is placed in the POWER drive-mode position, so that the vehicle can be driven with a higher degree of drivability when the selector switch 96 is placed in the POWER drive-mode position. The drive-mode selector switch 96 may have other drive-mode positions in addition to the NORMAL and POWER drive-mode positions. For instance, the drive-mode selector switch 96 has an ECONOMY drive-mode position and a SNOW drive-mode position as well as the NORMAL and POWER drive-mode position. When the selector switch 96 is placed in the ECONOMY drive-mode position, the transmission 10 is automatically shifted up and down according to an economy-drive shifting pattern suitable for economical running of the vehicle with a high degree of fuel economy. When the selector switch 96 is placed in the SNOW drive-mode position, the transmission 10 is automatically shifted up and down according to a snow-drive shifting pattern suitable for running (starting or acceleration, in particular) of the vehicle on a snow-covered roadway surface or any other roadway surface having a relatively low coefficient of friction with respect to the vehicle tires. For example, the shift-up and shift-down boundary lines of the economy-drive shifting pattern are shifted from those of the normal-drive shifting pattern in the direction of decrease of the vehicle speed V, and the snow-drive shifting pattern is formulated to prevent the transmission 10 from being placed in the first-speed position. Namely, the shifting actions of the transmission 10 take place at the relatively low vehicle speed according to the economy-drive shifting pattern than those according to the normal-drive shifting pattern, so that the vehicle is driven with a relatively small drive force. According to the snow-drive shifting pattern, the first-speed position is not established, and the second-speed position is the lowest-speed position, so that the vehicle drive force in the lowest-speed position of the transmission 10 is reduced.

FIG. 13A' shows a manually operable shifting device 94a which is a modification of the shifting device 94 of FIG. 13A. This modified shifting device 94a is different from the shifting device 94, in that the shifting device 94a does not have the manual-shift position M. The shifting device 94a has a shift lever 92 which is movable from the auto-shift position D to the shift-up position "+" and the shift-down position "−", which are located at the same position as the auto-shift position D in the longitudinal direction of the vehicle and are spaced from the auto-shift position D in the lateral direction of the vehicle. The presently selected range is changed toward the range L when the shift lever 92a is moved from the presently selected auto-shift position D (for the automatic shifting mode) to the shift-down position "−", and toward the range D when the shift lever 92a is moved from the auto-shift position D to the shift-up position "+", as in the first manner of shifting control of the transmission 10 when the shift lever 92 of the shifting device 94 of FIG. 13A is moved from the manual-shift position M to the shift-down and shift-up positions. Thus, a desired one of the ranges D through L can be electrically established by moving the shift lever 92a from the auto-shift position D to the shift-up and shift-down positions "+", "−" The shift lever 92a is biased so as to be normally held in the auto-shift position D, and one of the ranges D-L is selected according to the number of successive movements of the shift lever 92a to the shift-up or shift-down position or the length of time for which the shift lever 92a is held in the shift-up or shift-down position.

Alternatively, the presently selected one of the forward-drive positions (1st through 8th) may be changed by moving the shift lever 92a from the auto-shift position D to the shift-up or shift-down position "+", "−", such that the presently selected forward-drive position is changed toward the first-speed position (1st) when the shift lever 92a is moved to the shift-down position "−", and toward the eighth-speed position (8th) when the shift lever 92a is moved to the shift-up position "+", as in the second manner of shifting control of the transmission 10 when the shift lever 92 of FIG. 13 is placed in the manual-shift position.

FIG. 13B shows a manually operable shifting device 94b which is another modification of the shifting device 94. Like the shifting device 94 of FIG. 13A, this shifting device 94b is disposed adjacent to the vehicle operator's seat, and has the parking position P, reverse position R neutral position N, and auto-shift position D. However, the shift lever 94b further has seven positions 7, 6, 5, 4, 3, 2 and L for selecting the respective ranges 7-L that are equivalent to the ranges 7-L selectable in the above-described first manner by moving the shift lever 92 of FIG. 13A from the manual-shift position M to the shift-up and shift-down positions "+", "−".

Thus, the positions P, R, N, D and 7-L of the shift lever 92*a* have the same functions as described above with respect to the shift lever 92. Like the shifting device 94, the shifting device 94*b* is provided with a drive-mode selector switch 96*b* and a shift-position sensor 98*b* which are identical in function with the selector switch 96 and shift-position sensor 98 described above. The drive-mode selector switch 96*b* may have a MANUAL SHIFTING drive-mode position as well as the NORMAL and POWER drive-mode positions (or NORMAL, POWER, ECONOMY and SNOW drive-mode positions). When the drive-mode selector switch 96*b* is placed in the MANUAL SHIFTING drive-mode position, a manual-shifting pushbutton provided on the steering wheel of the vehicle becomes effective to manually shift up or down the transmission 10 to a selected one of the forward-drive positions, as in the second manner of shifting control of the transmission 10 by moving the shift lever 92 of the shifting device 94 from the manual-shift position M to the shift-up and shift-down positions "+", "−". In this manual shifting with the selector switch 96*b* placed in the MANUAL SHIFTING drive-mode position, the transmission 10 is manually shifted within the currently established range. For example, the transmission 10 is shifted to any one of the eight forward-drive positions (1st through 8th) when the shift lever 94*b* is placed in the auto-shift position D. The drive-mode selector switch 96*b* need not have the MANUAL SHIFTING drive-mode position, and a manual shifting selector switch may be provided in addition to the drive-mode selector switch 96*b* not having the MANUAL SHIFTING drive-mode position.

FIG. 13C shows a manually operable shifting device 94*c* which is a further modification of the shifting device 94. This shifting device 94*c* is different from the shifting device 94, in that a shift lever 92*c* of the shifting device 94*c* has the positions 7-L for selecting the respective ranges 7-L, as provided in the shifting device 94*b* of FIG. 13B. In the shifting device 94, therefore, one of the ranges D-L can be selected by either moving the shift lever 92*c* directly to the corresponding one of the positions D-L, or moving the shift leer 92*c* from the manual-shift position M to the shift-up or shift-down position "+", "−".

Figure 15:
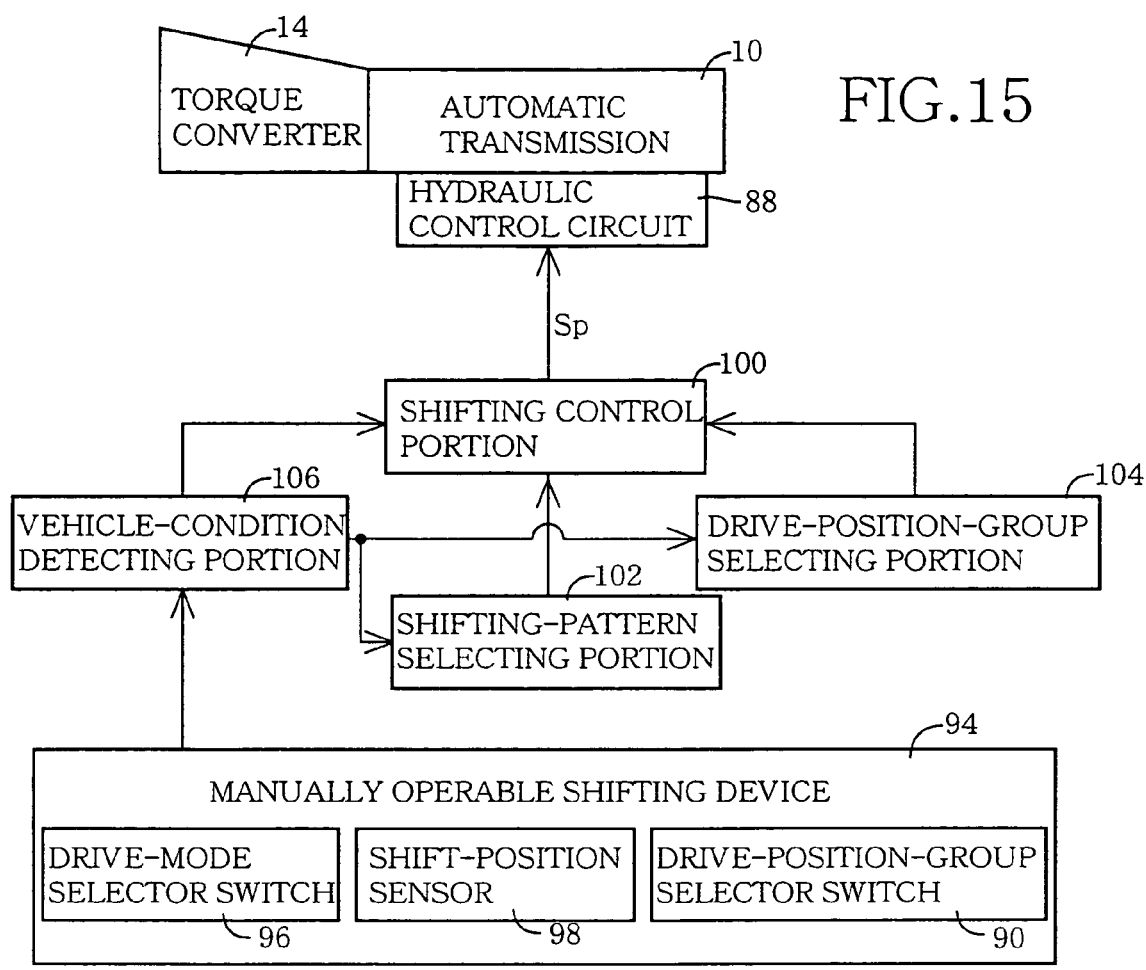
FIG. 15 is a block diagram illustrating major functional portions of the electronic control device of FIG. 10.

Referring next to the block diagram of FIG. 15, there will be described major functional portions of the electronic control device 80 which are arranged to control the shifting actions of the transmission 10. The electronic control device 80 incorporates a shifting control portion 100 operable to control the transmission 10 through the hydraulic control circuit 88, a shifting-pattern selecting portion 102, a drive-position-group selecting portion 104, and a vehicle-condition detecting portion 106. The vehicle-condition detecting portion 106 is arranged to detect the condition of the vehicle such as speed $N_E$ of the engine 8, speed $N_{IN}$ of the input shaft 16 (speed $N_T$ of the turbine impeller of the torque converter 14), vehicle running speed V, opening angle $\theta_{TH}$ of the throttle valve, operating amount $A_{CC}$ of the accelerator pedal, currently selected drive mode (NORMAL, POWER, ECONOMY, SNOW drive mode, etc.) of the vehicle, and currently selected position $P_{SH}$ of the shift lever 92 (92*a*, 92*b*, 92*c*), on the basis of the outputs of the various sensors such as the engine speed sensor, turbine speed sensor, output shaft sensor, throttle opening sensor, accelerator sensor, drive-mode selector switch 96 and shift-position sensor 98. Where the shifting device 94 is provided with a drive-position-group selecting switch 90 operable to select one of the normal-spread and narrow-spread groups of forward-drive positions or one of the normal-spread and wide-spread groups of forward-drive positions, the vehicle-condition detecting portion 106 detects the currently selected group of forward-drive positions. The vehicle-condition detecting portion 106 is further arranged to detect a change of the shifting mode of the transmission 10 from the automatic shifting mode to the manual shifting mode, on the basis of the output of the shift-position sensor 98 which is arranged to detect that the shift lever 92 is moved from the auto-shift position D to the manual-shift position M.

The shifting control portion 100 is arranged to apply control signals $S_P$ to the hydraulic control circuit 88, for controlling the engaging and releasing actions of the hydraulically operated frictional coupling devices in the form of the clutches C1-C4 and brakes B1-B3, so as to shift up and down the transmission 10 according to the currently selected position of the shift lever 92 (92*a*, 92*b*, 92*c*) detected by the vehicle-condition detecting portion 106. When the shift lever 92 placed in the auto-shift position D is detected by the vehicle-condition detecting portion 106, the shifting control portion 100 determines a need for a shift-up or shift-down action of the transmission 10 from the presently selected operating position to an appropriate one of the operating positions, on the basis of the detected throttle opening angle $\theta_{TH}$ and vehicle speed V, and according to the predetermined shift-up and shift-down boundary lines stored in the ROM, and applies the appropriate control signals $S_P$ to the hydraulic control circuit 88, for controlling the clutches C1-C4 and brakes B1-B3 to effect the determined shift-up or shift-down action of the transmission 10. This shifting control of the transmission 10 by the shifting control portion 100 is effected according to one of the normal-spread and narrow-spread groups or the normal-spread and wide-spread groups of forward-drive positions, which is selected by the drive-position-group selecting portion 104, as described below.

The shifting-pattern selecting portion 102 is arranged to select the shifting pattern used by the shifting control portion 100 to control the shifting actions of the transmission 10. For instance, the shifting-pattern selecting portion 102 selects the normal-drive shifting pattern or the power-drive shifting pattern on the basis of the shifting pattern selected by the drive-mode selector switch 96 of FIG. 13A (selector switch 96*b* of FIG. 13B). Alternatively, the shifting-pattern selecting portion 102 is arranged to select the appropriate shifting pattern on the basis of the vehicle condition detected by the vehicle detecting portion 106, for example, to select the power-drive shifting pattern when a running of the vehicle on an uphill road which requires a relatively large vehicle drive force is detected by the vehicle-condition detecting portion 106 on the basis of the detected operating amount Acc of the accelerator pedal, vehicle speed V and vehicle acceleration value, or to select the snow-drive shifting pattern when a running of the vehicle on a snow-covered road surface which requires a relatively small vehicle drive force is detected by the vehicle-condition detecting portion 106 on the basis of the detected amount of slipping of the drive wheels. However, the provision of the shifting-pattern selecting portion 102 is not essential.

The drive-position-group selecting portion 104 is arranged to select one of the normal-spread and narrow-spread groups of forward-drive positions of the transmission 10, or one of the normal-spread and wide-spread groups of forward-drive positions. In the transmission 10 of the first embodiment of FIGS. 2-5, the drive-position-group selecting portion 104 selects the narrow-spread groups of forward-drive positions when the vehicle is running at a relatively high speed on an uphill road or against a relatively strong wind, or when the drive-mode selector switch 96 is placed in the POWER drive-mode position. In this respect, it is noted that the seventh-speed and eighth-speed positions (7th and 8th) of the narrow-spread group provide a large vehicle drive force than those of the normal-spread group. In the transmission 10 of the second embodiment of FIGS. 6-9, the drive-position-group selecting portion 104 selects the wide-spread group of forward-drive positions when the vehicle is running at a relatively high constant speed. In this respect, it is noted that the seventh-speed and eighth-speed positions of the wide-spread group have lower speed ratios and are effective to improve the fuel economy of the vehicle. Alternatively, the drive-position-group selecting portion 104 selects the appropriate group of forward-drive positions on the basis of the group manually selected by the drive-position-group selector switch 90 and detected by the vehicle-condition detecting portion 106. The drive-position-group selecting portion 104 is further arranged to select the appropriate one of the normal-spread and narrow-spread groups or the normal-spread and wide-spread groups, upon switching of the shifting mode from the automatic shifting mode to the manual shifting mode by a movement of the shift lever 92 from the auto-shift position D to the manual-shift position M, for example, in order to prevent an undesirable change of the speed ratio of the transmission 10 due to the switching of the shifting mode. For instance, the drive-position-group selecting portion 104 is operated, upon detecting of the shifting mode from the automatic shifting mode to the manual shifting mode by the vehicle-condition detecting portion 106, to select the group of forward-drive positions which was selected last in the automatic shifting mode, that is, selected immediately before a moment of shifting of the automatic transmission 10 from the automatic shifting mode to the manual shifting mode.

Figure 16:
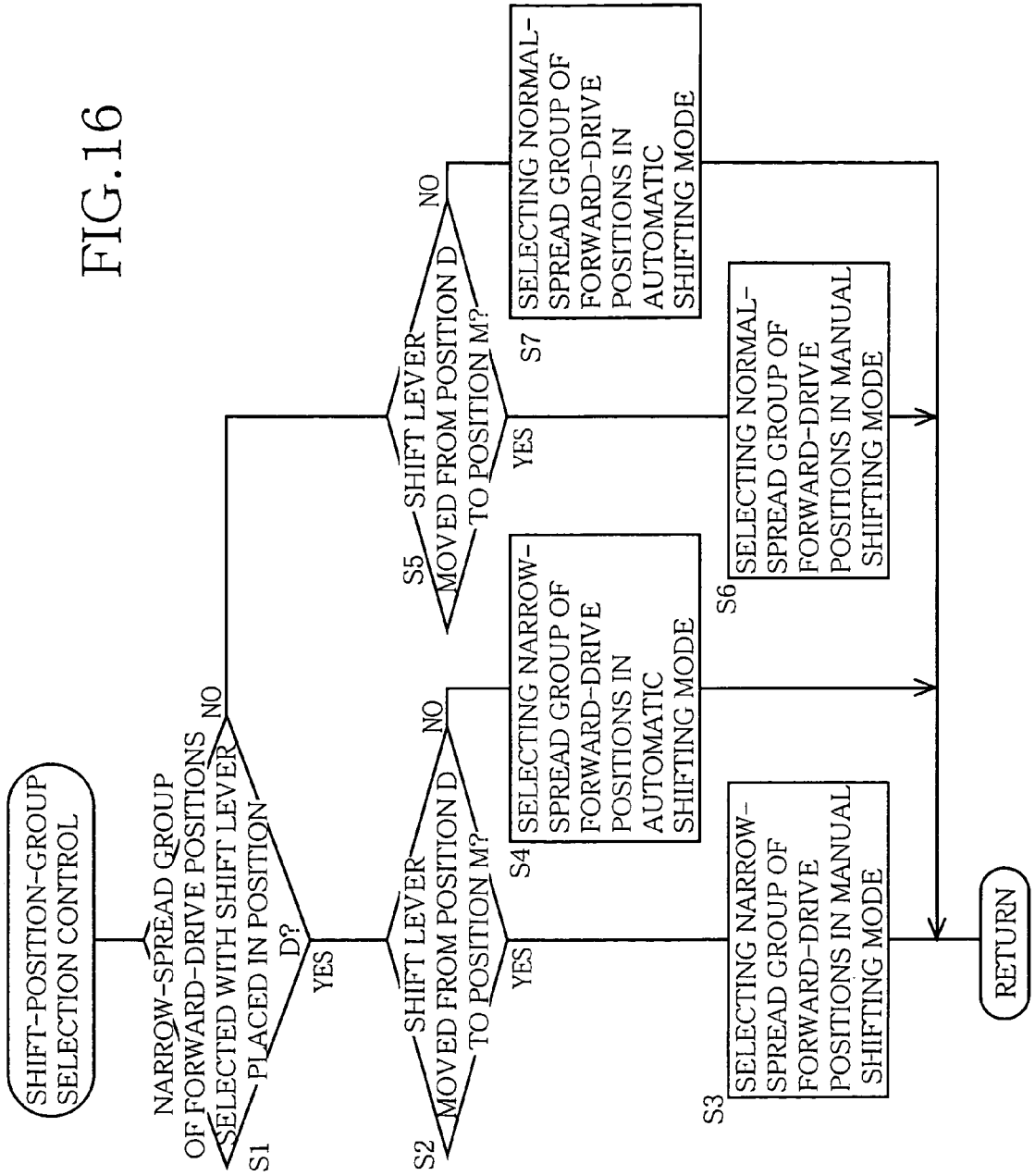
FIG. 16 is a flow chart illustrating a control routine executed by the electronic control device of FIG. 10 to select one of the normal-spread and narrow-spread groups of forward-drive positions of the automatic transmission of the first embodiment of FIG. 1.

Referring next to the flow chart of FIG. 16, there will be described the operation of the electronic control device 80 to select one of the normal-spread and narrow-spread groups of forward-drive positions of the transmission 10 of the first embodiment of FIGS. 2-5, that is, one of the normal-spread group of forward-drive positions of FIGS. 2 and 3 and the narrow-spread groups of forward-drive positions of FIGS. 4 and 5, by way of example. The control routine illustrated in the flow chart of FIG. 16 is initiated with step S1 corresponding to the vehicle-condition detecting portion 106, to determine whether the narrow-spread group is presently selected in the automatic shifting mode with the shift lever 92 placed in the auto-shift position D, for example. This determination is effected on the basis of the currently selected position $P_{SH}$ of the shift lever 92 detected by the shift-position sensor 98 and the currently selected group of forward-drive positions of the transmission 10. If an affirmative decision (YES) is obtained in step S1, the control flow goes to step S2 corresponding to the vehicle-condition detecting portion 106, to determine whether the shifting mode has been changed from the automatic shifting mode to the manual shifting mode. This determination is effected on the basis of a change of the output signal of the shift-position sensor 98 indicative of a movement of the shift lever 92 of the shifting device 94 from the auto-shift position D to the manual-shift position M, for example. If an affirmative decision (YES) is obtained in step S2, the control flow goes to step S3 corresponding to the drive-position-group selecting portion 104, to select the narrow-spread group of forward-drive positions which was selected before the shifting mode was changed from the automatic shifting mode to the manual shifting mode. In the manual shifting mode, therefore, the transmission 10 is shifted to one of the forward-drive positions of the narrow-spread group. If a negative decision(NO) is obtained in step S2, that is, if the automatic shifting mode is presently selected, the control flow goes to sep S4 corresponding to the drive-position-group selecting portion 104, to maintain the narrow-spread group of forward-drive positions in the automatic shifting mode.

If a negative decision (NO) is obtained in step S1, that is, if the normal-spread group of forward-drive positions is presently selected, the control flow goes to step S5 corresponding to the vehicle-condition detecting portion 106, to determine whether the shifting mode has been changed from the automatic shifting mode to the manual shifting mode. This determination is effected on the basis of a change of the output signal of the shift-position sensor 98 indicative of the movement of the shift lever 92 from the auto-shift position D to the manual-shift position M, for example. If an affirmative decision (YES) is obtained in step S5, the control flow goes to step S6 corresponding to the drive-position-group selecting portion 104, to select the normal-spread group of forward-drive positions which was selected in the automatic shifting mode. If a negative decision (NO) is obtained in step S5, that is, if the automatic shifting mode is presently selected, the control flow goes to step S7 corresponding to the drive-position-group selecting portion 104, to maintain the normal-spread group of forward-drive positions in the automatic shifting mode.

Figures 6, 7:
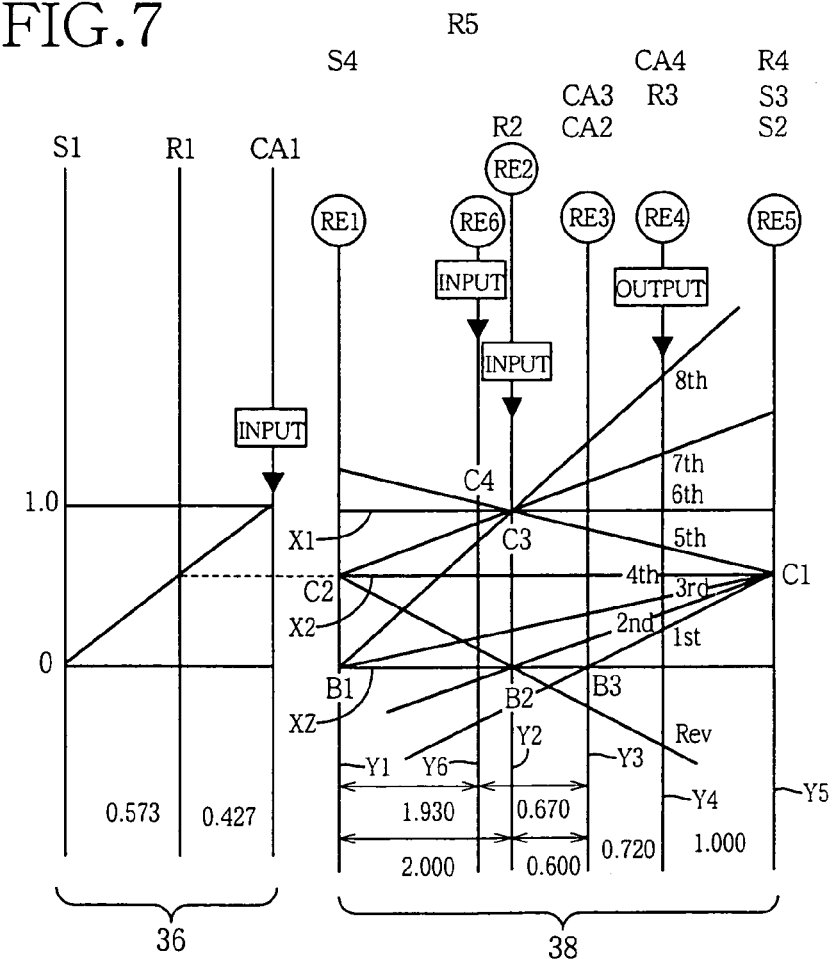
FIG. 6 is a view corresponding to that of FIG. 2, indicating a relationship between the operating positions of a planetary gear type multi-step automatic transmission constructed according to a second embodiment of this invention, and respective combinations of operating states of the frictional coupling devices, when a normal-spread group of operating positions is selected.
FIG. 7 is a collinear chart showing an operation of the automatic transmission of the second embodiment when the normal-spread group of operating positions is selected.

While the control routine for selecting one of the normal-spread and narrow-spread groups of forward-drive positions of the transmission 10 has been described above by reference to the flow chart of FIG. 16, a control routine similar to the control routine of FIG. 16 is executed for selecting one of the normal-spread group of FIGS. 6 and 7 and the wide-spread group of FIGS. 8 and 9. Namely, step S1 is modified to determine whether the wide-spread group is presently selected in the automatic shifting mode, and steps S3 and S4 are modified to select the wide-spread group. That is, the drive-position-group selecting portion 104 is arranged to select, upon switching from the automatic shifting mode to the manual shifting mode, the group of forward-drive positions which was selected in the automatic shifting mode.

As described above, one of the two different groups of forward-drive positions which was selected in the automatic shifting mode is initially selected in the manual shifting mode when a change of the shifting mode from the automatic shifting mode to the manual shifting mode is detected in step S2 or S5 on the basis of a movement of the shift lever 92 from the auto-shift position D to the manual-shift position M. In the thus established manual shifting mode, one of the ranges D-L or one of the forward-drive positions, which was selected last in the automatic shifting mode is initially selected, as well as the group of forward-drive positions which was selected in the automatic shifting mode is selected when the movement of the shift lever 92 from the auto-shift position D to the manual-shift position M is detected in step S2 or S5. However, the range or forward-drive position initially selected in the manual shifting mode may be next to the range or forward-drive position selected last in the automatic shifting mode, as seen in the direction toward the range L or first-speed position (1st). The latter arrangement wherein the initially selected range or forward-drive position is next to that selected last in the automatic shifting mode is intended to rapidly increase the vehicle drive force in view of a tendency that the vehicle operator moves the shift lever 92 from the auto-shift position D to the manual-shift position M, for the purpose of increasing the vehicle drive force. The principle of the control routine of FIG. 16 also applies to the vehicle provided with the shifting device 94a, 94b or 94c.

The control routine of FIG. 16 is formulated such that one of the normal-spread and narrow-spread groups or normal-spread and wide-spread groups of forward-drive positions, which was selected in the automatic shifting mode, is selected in the manual shifting mode in step S3 or S6 corresponding to the drive-position-group selecting portion 104, upon manual movement of the shift lever 92 of the shifting device 94 from the auto-shift position D to the manual-shift position M, for example, so that the drivability of the vehicle is improved without an undesirably or unexpectedly large degree of change of the speed ratio of the transmission 10 upon switching of the shifting mode from the automatic shifting mode to the manual shifting mode.

Further, the drive-position-group selectors switch 90 incorporated in the shifting device 94 can be effectively used to manually select a desired one of the two groups of forward-drive positions, depending upon the vehicle running condition or the driving mode of the vehicle desired by the vehicle operator. For instance, the vehicle operator can select the narrow-spread group of forward-drive positions when the vehicle operator desires to drive the vehicle in a sporty fashion, or the wide-spread group of forward-drive positions when the vehicle operator desires to improve the driving economy of the vehicle.

In the present transmission 10, the two groups of forward-drive positions are easily obtained by changing the combinations of the two frictional coupling devices to be engaged to establish the seventh-speed and eighth-speed positions, more precisely, by engaging the third clutch C3 as well as the second clutch C2 to establish the seventh-speed position of the normal-spread group, and the third clutch C3 as well as the first brake B1 to establish the eighth-speed position of the normal-spread group, and by engaging the fourth clutch C4 as well as the second clutch C2 to establish the seventh-speed position of the narrow-spread or wide-spread group and the clutch C4 as well as the first brake B1 to establish the eighth-speed position of the narrow-speed or wide-spread group.

Referring next to FIGS. 17-34, there will be described automatic transmissions constructed according to other embodiments of this invention. In the these other embodiments, the same reference signs as used in the first embodiment will be used to identify the functionally corresponding components, which will not be described.

Figure 17:
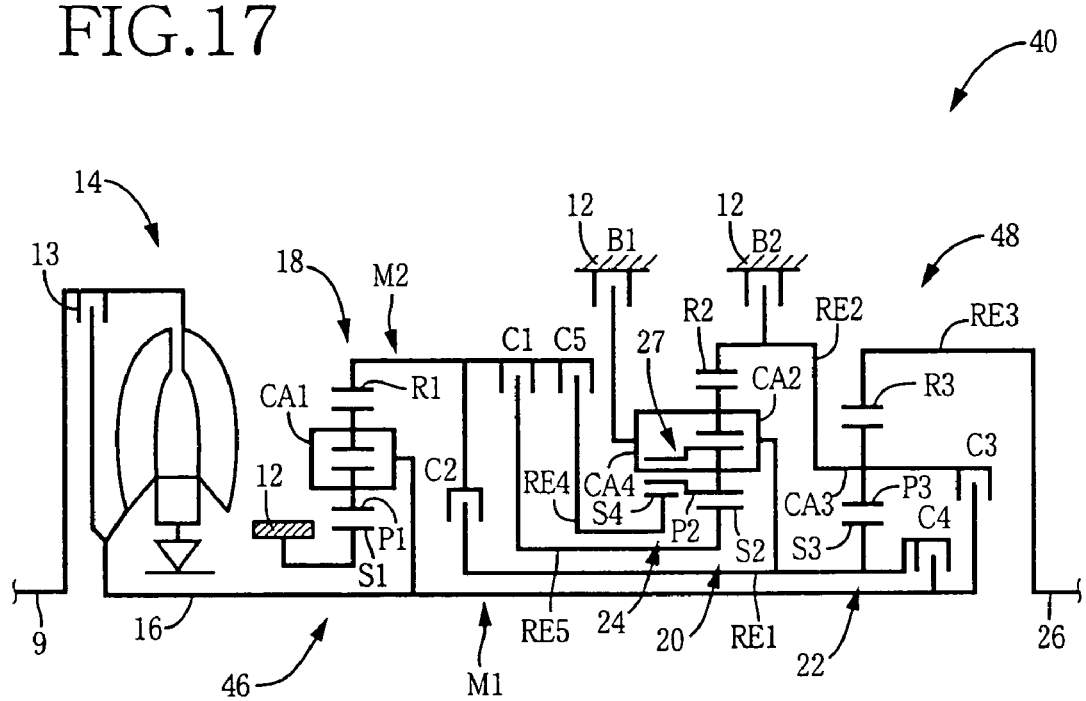
FIG. 17 is a schematic view illustrating a basic arrangement of a planetary gear type multiple-step automatic transmission for a vehicle, which is constructed according to a third embodiment of the present invention.

As shown in the schematic view of FIG. 17, an automatic transmission 40 according to a third embodiment has a first shifting portion 46 similar to the first shifting portion 36 of the transmission 10, and a second shifting portion 48 which is different from the second shifting portion 38 of the transmission 10. The transmission 40 has a normal-spread group of nine operating positions indicated in the table of FIG. 18 and the collinear chart of FIG. 19.

The first planetary gear set 18 of the first shifting portion 46 of the transmission 40 is of a double-pinion type and has a gear ratio ρ1 of about 0.500. The first shifting portion 46 is identical with the first shifting portion 36 of the transmission 10, except for the gear ratio ρ1.

The second planetary gear set 20 of the second shifting portion 48 is of a double-pinion type, and the third planetary gear set 22 of the second shifting portion 48 is of a single-pinion type. The second planetary gear set 20 has a second sun gear S2, a plurality of pairs of second planetary gears P2 meshing with each other, a second carrier CA2 supporting the second planetary gears P2 such that each second planetary gear P2 is rotatable about its axis and rotatable about the axis of the second sun gear S2, and a second ring gear R2 meshing with the second sun gear S2 through the second planetary gears P2. The second planetary gear set 20 has a gear ratio of ρ2 of about 0.444, for example. The third planetary gear set 22 has a third sun gear S3, a third planetary gear P3, a third carrier CA3 supporting the third planetary gear P3 such that the third planetary gear P3 is rotatable about its axis and rotatable about the axis of the third sun gear S3, and a third ring gear R3 meshing with the third sun gear S3 through the third planetary gear P3. The third planetary gear set 22 has a gear ratio ρ3 of about 0.500, for example. One of the pairs of second planetary gears P2 is a stepped pinion which includes a large-diameter gear portion meshing with the second sun gear S2 or the second ring gear R2, and a small-diameter gear portion 27 that meshes with a fourth sun S4 of the fourth planetary gear set 24. This fourth planetary gear set 24 has a gear ratio ρ4 of about 0.483, for example. However, the second planetary gear set 20 may have a single second planetary gear P2 having the gear portion 27 which functions as the fourth planetary gear P4. In this case, the fourth planetary gear set 24 has a fourth sun gear S4, a fourth planetary gear P4, a fourth carrier CA4 supporting the fourth planetary gear P4 such that the planetary gear P4 is rotatable about its axis and rotatable about the axis of the fourth sun gear S4, and a fourth ring gear R4 meshing with the fourth sun gear S4 through the fourth planetary gear P4.

In the second shifting portion 48, the second carrier CA2 and the third sun gear S3 which are integrally connected to each other and are selectively connected through a second clutch C2 to the second intermediate output path M2, namely, to the first ring gear R1 functioning as the second intermediate output member, and are selectively connected through a fourth clutch C4 to the first intermediate output path M1, namely, to the first carrier CA1 functioning as the first intermediate output member. The second carrier CA2 and a third sun gear S3 are selectively fixed by a first brake B1 to the transmission casing 12 functioning as the non-rotatable member. The second ring gear R2 and the third carrier CA3 which are integrally connected to each other are selectively connected through a third clutch C3 to the first carrier CA1 functioning as the first intermediate output member, and are selectively fixed by a second brake B2 to the transmission casing 12. The third ring gear R3 is connected to an output member in the form of an output shaft 26, and the fourth sun gear S4 is selectively connected through a fifth clutch C5 to the first ring gear R1 functioning as the second intermediate output member. The second sun gear S2 is selectively connected through a first clutch C1 to the first ring gear R1.

The first, second, third, fourth and fifth clutches C1-C5 and the first and second B1 and B2 are all hydraulically operated frictional coupling devices widely used in known step-variable automatic transmissions, multiple-disc type frictional coupling devices, as described above with respect to the first embodiment.

Figures 18, 19:
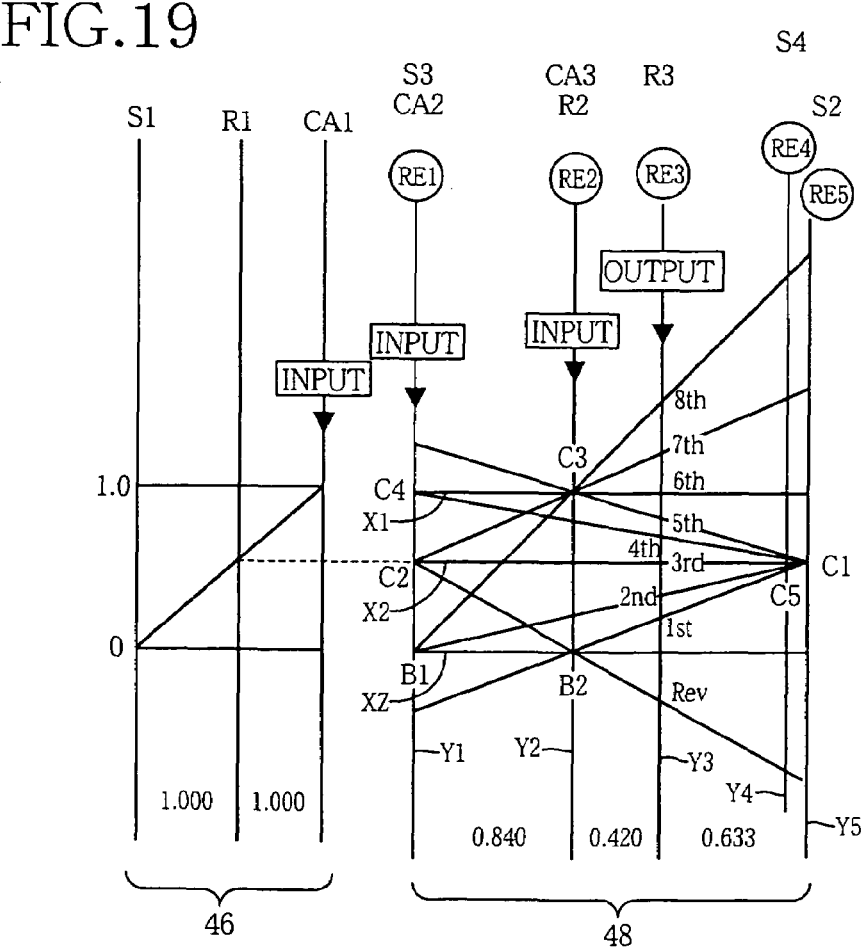
FIG. 18 is a view indicating a relationship between the operating positions of the automatic transmission of FIG. 17 and respective combinations of operating states of hydraulically operated frictional coupling devices, when a normal-spread group of operating positions is selected.
FIG. 19 is a collinear chart showing an operation of the automatic transmission of FIG. 17 when the normal-spread group of operating positions is selected.

In the transmission 40 constructed as described above, a selected one of eight forward-drive positions (1st through 8th) and a rear-drive position (Rev) is established by simultaneous engaging actions of a corresponding combination of two frictional coupling devices selected from the first through fifth clutches C1-C5 and first and second brakes B1, B2, as shown in FIG. 18. The eight forward-drive positions have respective speed ratios γ1-γ8 that change as geometric series. The gear ratio γ is equal to $N_{IN}/N_{OUT}$, where $N_{IN}$ and $N_{OUT}$ represent rotating speeds of the input shaft 16 and the output shaft 26, respectively.

As shown in FIG. 18, the first-speed position (1st) having the highest speed ratio γ1 of about 5.014, for example, is established by engaging actions of the first clutch C1 and the second brake B2. The second-speed position (2nd) having the speed ratio γ2 of about 3.005, for example, which is lower than that of the first-speed position, is established by engaging actions of the first clutch C1 and the first brake B1. The third-speed position (3rd) having the speed ratio γ3 of about 2.000, for example, which is lower than that of the second-speed position, is established by engaging actions of the first and second clutches C1 and C2. The fourth-speed position (4th) having the speed ratio γ4 of about 1.499, for example, which is lower than that of the third-speed position, is established by engaging actions of the first and fourth clutches C1 and C4. The fifth-speed position (5th) having the speed ratio γ5 of about 1.249 for example, which is lower than that of the fourth-speed position, is established by engaging actions of the first and third clutches C1 and C3. The sixth-speed position (6th) having the speed ratio γ6 of about 1.000, for example, which is lower than that of the fifth-speed position, is established by engaging actions of the third and fourth clutches C3 and C4. The seventh-speed position (7th) having the speed ratio γ7 of about 0.800, for example, which is lower than that of the sixth-speed position, is established by engaging actions of the second and third clutches C2 and C3. The eighth-speed position (8th) having the speed ratio γ8 of about 0.667, for example, which is lower than that of the seventh-speed position, is established by engaging actions of the third clutch C3 and the first brake B1.

The rear-drive position (Rev) having a speed ratio $\gamma_R$ of 4.000, for example, which is intermediate between those of the second- and third-speed positions, is established by engaging actions of the second clutch C2 and the second brake B2. The first-speed through eighth-speed positions (1st through 8th) indicated in FIG. 18 constitute a normal-spread group of forward-drive positions having a set of speed ratios γ1-γ8. The speed ratios ρ1-ρ4 of the first through fourth planetary gear sets 18, 20, 22, 24 are determined to establish the above-indicated speed ratios γ1-γ8 and $\gamma_R$ of the nine operating positions (1st trough 8th, and Rev).

In the specific example of FIG. 18, stepping ratios of the adjacent forward-drive positions of the normal-spread group of the transmission 40, and an overall speed ratio range ("spread") of the normal-spread group of eight forward-drive positions are determined as described below. Namely, the stepping ratio (γ1/γ2) which is a ratio of the speed ratio γ1 of the first-speed position to the speed ratio γ2 of the second-speed position is 1.669, and the stepping ratio (γ2/γ3) which is a ratio of the speed ratio γ2 of the second-speed position to the speed ratio γ3 of the third-speed position is 1.502. The stepping ratio (γ3/γ4) which is a ratio of the speed ratio γ3 of the third-speed position to the speed ratio γ4 of the fourth-speed position is 1.334. The stepping ratio (γ4/γ5) which is a ratio of the speed ratio γ4 of the fourth-speed position to the speed ratio γ5 of the fifth-speed position is 1.200. The stepping ratio (γ5/γ6) which is a ratio of the speed ratio γ5 of the fifth-speed position to the speed ratio γ6 of the sixth-speed position is also 1.249. The stepping ratio (γ6/γ7) which is a ratio of the speed ratio γ6 of the sixth-speed position to the speed ratio γ7 of the seventh-speed position is 1.250, and the stepping ratio (γ7/γ8) which is a ratio of the speed ratio γ7 of the seventh-speed position to the speed ratio γ8 of the eighth-speed position is 1.200. Thus, the speed ratios γ1-γ8 change as the geometric series. The overall speed ratio range or "spread"=γ1/γ8=5.014/0.667) of the normal-spread group of eight forward-drive positions is as wide as about 7.521.

The collinear chart of FIG. 19 indicates, by straight lines, a relationship among the rotating speeds of the rotary elements of the first and second shifting portions 46, 48 when the transmission 40 is placed in each of its operating positions. A portion of this collinear chart of FIG. 19 which represents the first shifting portion 46 is identical with that of FIG. 3 which represents the first shifting portion 36, except for the distances between the adjacent ones of the three vertical lines, which distances are determined by the gear ratio ρ1 of the first planetary gear device 18. Five vertical straight lines Y1-Y5 on the right side of the above-indicated three vertical straight lines respectively correspond to a first rotary element RE1 in the form of the second carrier CA2 and third sun gear S3 connected to each other, a second rotary element RE2 in the form of the second ring gear R2 and third carrier CA3 connected to each other, a third rotary element RE3 in the form of the third ring gear R3, a fourth rotary element RE4 in the form of the fourth sun gear S4, and a fifth rotary element RE5 in the form of the second sun gear S2. The distances between the adjacent ones of the vertical straight lines Y1-Y5 are determined by the gear ratios ρ2-ρ4 of the second, third and fourth planetary gear sets 20, 22, 24.

Referring to the collinear chart of FIG. 19, the arrangement of the present transmission 40 will be described in further detail. In the first shifting portion 46, the first carrier CA1 which is one of the three rotary elements of the first planetary gear set 18 is connected to the input shaft 16 (input rotary member) and the first intermediate output path M1, and the first sun gear S1 which is another of the three rotary elements is non-rotatably fixed to the transmission casing 12 (non-rotatable member), while the first ring gear R1 which is the third rotary element is connected to the second intermediate output path M2, so that the rotary motion of the input shaft 16 is transmitted to the second shifting portion 48 through the first intermediate output path M1, and the second intermediate output path M2 the rotating speed of which is reduced with respect to that of the first intermediate output path M1. In the second shifting portion 48, the first rotary element RE1 in the form of the second carrier CA2 and third sun gear S3 is selectively connected through the second clutch C2 to the first ring gear R1 (second intermediate output path M2), and selectively connected through the fourth clutch C4 to the first carrier CA1 (first intermediate output path M1), and is further selectively fixed by the first brake B1 to the transmission casing 12, and the second rotary element RE2 in the form of the second ring gear R2 and third carrier CA3 is selectively connected through the third clutch C3 to the first carrier CA1, and is selectively fixed by the brake B2 to the transmission casing 12. The third rotary element RE3 in the form of the third ring gear R3 is selectively connected to the output shaft 26, and the fourth rotary element RE4 in the form of the fourth sun gear S4 is selectively connected to the first ring gear R1. The fifth rotary element RE5 in the form of the second sun gear S2 is selectively connected through the first clutch C1 to the first ring gear R1.

As is apparent from the collinear chart of FIG. 19, a selected one of the nine operating positions (1st through 8th and Rev) of the transmission 40 is established by simultaneous engaging actions of the corresponding combination of two frictional coupling devices selected from among the first clutch C1, second clutch C2, third clutch C3, fourth clutch C4, first brake B1 and second brake B2, so that the corresponding rotary elements selected from the first through fifth rotary elements RE1-RE5 are connected to the first intermediate output path M1, for rotation at a speed corresponding to the speed ratio of 1.0, or connected to the second intermediate output path M2, for rotation at the speed N×2, or fixed to the transmission casing 12 and held stationary. The rotating speeds of the output shaft 26 when the transmission 40 is placed in the nine operating positions ($1^{st}$-speed through $8^{th}$-speed positions, and rear-drive position Rev) are indicated along the vertical straight line Y3. In the first-speed position, for example, the fifth rotary element RE5 is connected through the engaged first clutch C1 to the second intermediate output path M2, and is rotated at the speed N×2, while the second rotary element RE2 is fixed by the engaged second brake B2 to the transmission casing 12 and is held stationary. In this case, the rotating speed of the output shaft 26 is represented by a point of intersection of the vertical straight line Y3 and an inclined straight line which connects a point of intersection (indicated at "1st" in FIG. 19) between the vertical straight line Y5 and the horizontal straight line X2 and a point of intersection between the vertical straight line Y2 and the horizontal straight line XZ.

Figures 20, 21:
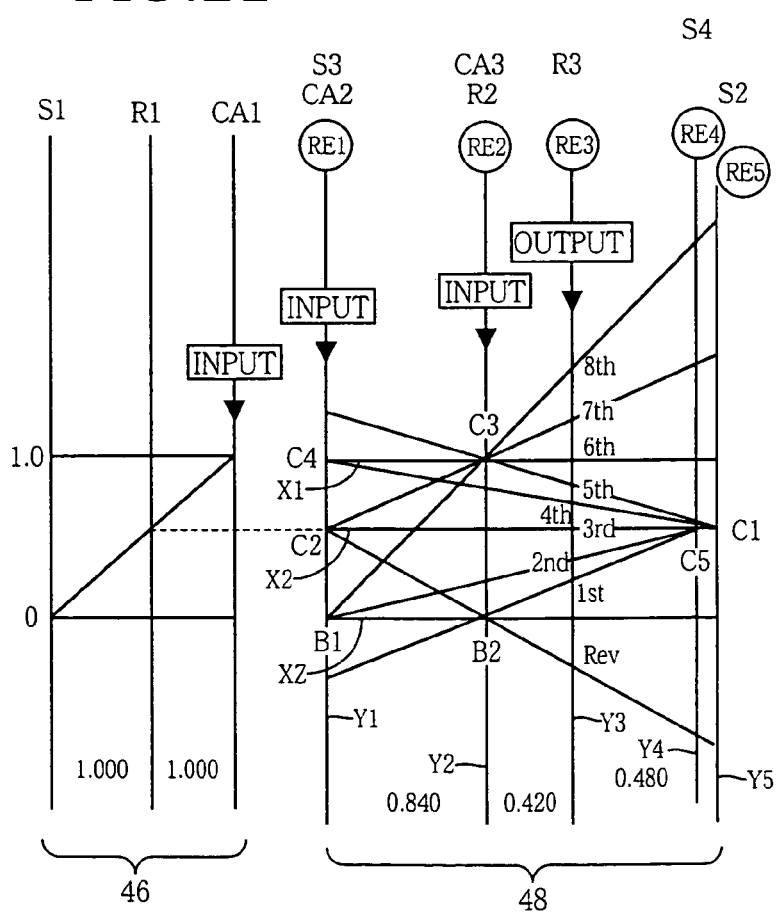
FIG. 20 is a view indicating a relationship between the operating positions of the automatic transmission of FIG. 17 and respective combinations of operating states of the frictional coupling devices, when a narrow group of operating positions is selected.
FIG. 21 is a collinear chart showing an operation of the automatic transmission of FIG. 17 when the narrow-spread group of operating positions of the automatic transmission is selected.

As described above, the first-speed through eighth-speed positions (1st through 8th) indicated in FIG. 18 constitute the normal-spread or wide-spread group of forward-drive positions which has the set of speed ratios γ1-γ8 and a relatively wide overall speed ratio range or spread. The first-speed, second-speed and third-speed positions are established by engaging the first clutch C3 as well as the second brake B2, first brake B1 and second clutch C2, respectively. The present transmission 40 further has a narrow-spread group of nine operating positions wherein the first-speed, second-speed and third-speed positions "1st", "2nd" and "3rd" are established by engaging the fifth clutch C5 in place of the first clutch C1, as well as the second brake B2, first brake B2 and second clutch C2, respectively, as indicated in FIGS. 20 and 21. The speed ratios of these first-, second- and third-speed positions of the narrow-spread group of operating positions of FIG. 20, which are established by engaging the fifth clutch C5, are lower than or equal to those of the normal-spread group of operating positions of FIG. 18, which are established by engaging the first clutch C1, and are determined by the position of the fourth rotary element RM4 (fourth sun gear S4) in the direction parallel to the horizontal axis of the collinear chart of FIG. 21. That is, the speed ratios of the first-, second- and third-speed positions of the narrow-spread group are determined by a gear ratio ρ4 of the fourth planetary gear set 24.

The narrow-spread group of operating positions indicated in FIGS. 20 and 21 is different from the normal-spread group of operating positions indicated in FIGS. 18 and 19, only in the combinations of the two frictional coupling devices to be engaged to establish the first-speed, second-speed and third-speed positions and in the speed ratios of these three forward-drive positions. Namely, the first-speed position having a speed ratio γ1 of about 4.286, for example, is established by engaging the fifth clutch C5 as well as the second brake B2, and the second-speed position having a speed ratio γ2 of about 2.762 is established by engaging the fifth clutch C4 as well as the first brake B1, while the third-speed position having a speed ratio γ3 of about 2.000 is established by engaging the fifth clutch C5 as well as the second clutch C2. Since the speed ratios γ1-γ3 of the first-speed, second-speed and third-speed positions of the narrow-spread group are lower than or equal to those of the normal-spread group of FIG. 18, the overall speed ratio range or spread (=γ1/γ8=6.429) of the narrow-spread group is accordingly narrower than that (7.521) of the normal-spread or wide-spread group of FIG. 18. Accordingly, the transmission 40 placed in the first-speed or second-speed position of the normal-spread group (having a comparatively wide spread) provides a larger drive torque than in the corresponding position of the narrow-spread group. Therefore, the first-speed and second-speed positions of the normal-spread or wide-spread group of forward-drive positions of FIG. 18 can be effectively used where a relatively large vehicle drive force is required for starting of the vehicle, or rapid acceleration of the vehicle at a relatively low running speed. Thus, the transmission 40 has the normal-spread or wide-spread group of forward-drive positions of FIG. 18 and the narrow-spread group of forward-drive positions of FIG. 20. When the first-, second- or third-speed position of the narrow-spread group of FIG. 20 is established by engaging the fifth clutch C5, the fourth rotary element RE4 is connected to the second intermediate output path M2. It is noted that the third-speed position (3rd) of the narrow-spread group may be established by engaging the first and fifth clutches C1, C5, or the first and second clutches C1, C2, namely, by engaging any two of the first, second and fifth clutches C1, C2, C5.

Figure 22:
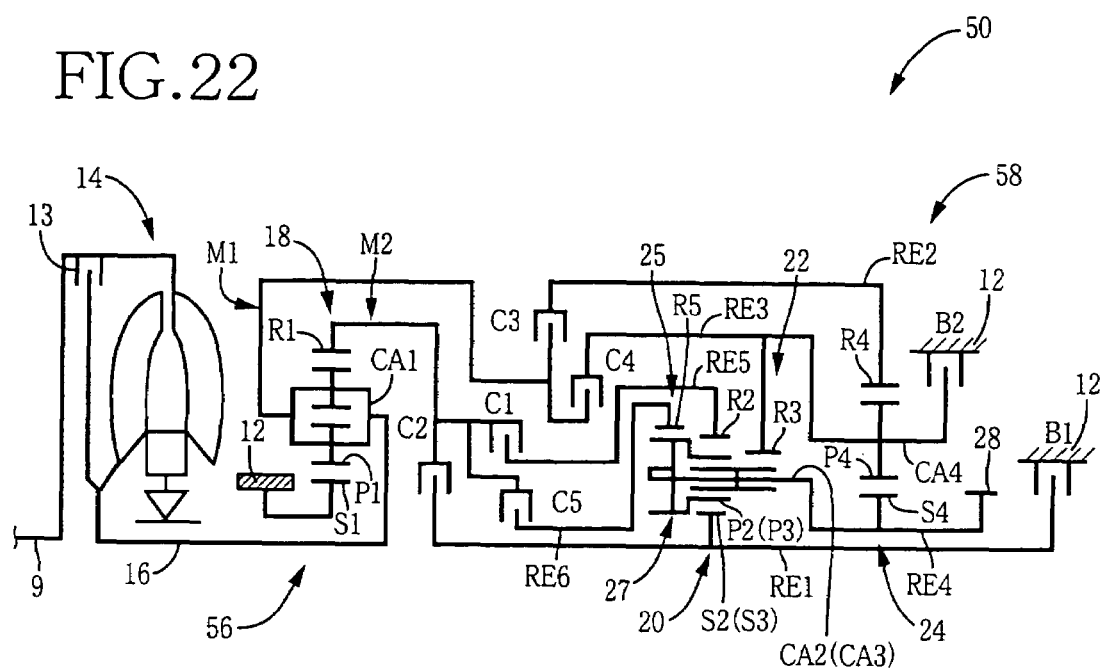
FIG. 22 is a schematic view corresponding to that of FIG. 1, illustrating a basic arrangement of a planetary gear type multiple-step automatic transmission for a vehicle, which is constructed according to a fourth embodiment of the present invention.

Reference is now made to the schematic view of FIG. 22, an automatic transmission 50 according to a fourth embodiment has a first shifting portion 56 similar to the first shifting portion 36 of the transmission 10, and a second shifting portion 58 which is different from the second shifting portion 38 of the transmission 10. The transmission 50 has a narrow-spread group of nine operating positions indicated in the table of FIG. 23 and the collinear chart of FIG. 24.

The first planetary gear set 18 of the first shifting portion 56 of the transmission 50 is of a double-pinion type and has a gear ratio ρ1 of about 0.450. The first shifting portion 56 is identical with the first shifting portion 36 of the transmission 10, except for the gear ratio ρ1.

The second and fourth planetary gear sets 20, 24 of the second shifting portion 58 are of a single-pinion type, and the third planetary gear set 22 of the second shifting portion 58 is of a single-pinion type. The second planetary gear set 20 has a second sun gear S2, a second planetary gear P, a second carrier CA2 supporting the second planetary gear P2 such that the second planetary gear P2 is rotatable about its axis and rotatable about the axis of the second sun gear S2, and a second ring gear R2 meshing with the second sun gear S2 through the second planetary gear P2. The second planetary gear set 20 has a gear ratio of ρ2 of about 0.451, for example. The third planetary gear set 22 has a third sun gear S3, a plurality of pairs of third planetary gears P3 meshing with each other, a third carrier CA3 supporting the third planetary gears P3 such each third planetary gear P3 is rotatable about its axis and rotatable about the axis of the third sun gear S3, and a third ring gear R3 meshing with the third sun gear S3 through the third planetary gears P3. The third planetary gear set 22 has a gear ratio ρ3 of about 0.368, for example. The fourth planetary gear 24 has a fourth sun gear S4, a fourth planetary gear P4, a fourth carrier supporting the fourth planetary gear P4 such that the fourth planetary gear P4 is rotatable about its axis and rotatable about the axis of the fourth sun gear S4, and a fourth ring gear R4 meshing with the fourth sun gear S4 through the fourth planetary gear P4. The fourth planetary gear set 24 has a gear ratio 4 of about 0.286, for example. The second planetary gear P2 is a stepped pinion which includes a small-diameter gear portion meshing with the second sun gear S2 and the second ring gear R2, and a large-diameter gear portion 27 that meshes with a fifth ring gear R5 of the fifth planetary gear set 25. The fifth planetary gear set 25 has a gear ratio ρ5 of about 0.561, for example. However, the second planetary gear P2 may be a non-stepped pinion having only the gear portion 27 functioning as a fifth planetary gear P5 of the fifth planetary gear set 25. In this modified arrangement of the second shifting portion 38, the fifth planetary gear set 25 has a fifth sun gear S5, the above-indicated fifth planetary gear P5, a fifth carrier CA5 supporting the fifth planetary gar P5 such that the fifth planetary gear P3 is rotatable about its axis and rotatable about the axis of the fifth sun gear S5, and a fifth ring gear R5 meshing with the fifth sun gear S5 through the fifth planetary gear P5.

The second and third planetary gear sets 20, 22 are arranged such that the second carrier CA2 and the third carrier CA3 are constituted by a single common component, and the second sun gear S3 and the third sun gear S3 are constituted by a single common component, while the second planetary gear P2 also functions as one of the two meshing third planetary gears P3. Each of the single common components indicated above may be two separate components.

In the second shifting portion 58, the second carrier CA2 and the third sun gear S3 which are integrally connected to each other and are selectively connected through a second clutch C2 to the second intermediate output path M2, namely, to the first ring gear R1 functioning as the second intermediate output member, and are selectively fixed by a first brake B1 to the transmission casing 12 (non-rotatable member), and the fourth ring gear R4 is selectively connected through a third clutch C3 to the first intermediate output path M1, namely, to the first carrier CA1 functioning as the first intermediate output member. The third ring gear R3 and fourth carrier CA4 are integrally connected to each other and are selectively connected through a fourth clutch C4 to the first carrier CA1 (first intermediate output member), and is selectively fixed by a second brake B2 to the transmission casing 12 (non-rotatable member). The second and third carriers CA2, CA3 which are integrally connected to each other are connected to the output rotary member in the form of the output gear 28, and the second ring gear R2 is selectively connected through a first clutch C1 to the first ring gear R1 functioning as the second intermediate output member. The fifth ring gear R5 is selectively connected through a fifth clutch C5 to the first ring gear R1 (second intermediate output member).

The first, second, third, fourth and fifth clutches C1-C5 and the first and second B1 and B2 are all hydraulically operated frictional coupling devices widely used in known step-variable automatic transmissions, multiple-disc type frictional coupling devices, as described above with respect to the first embodiment.

Figures 23, 24:
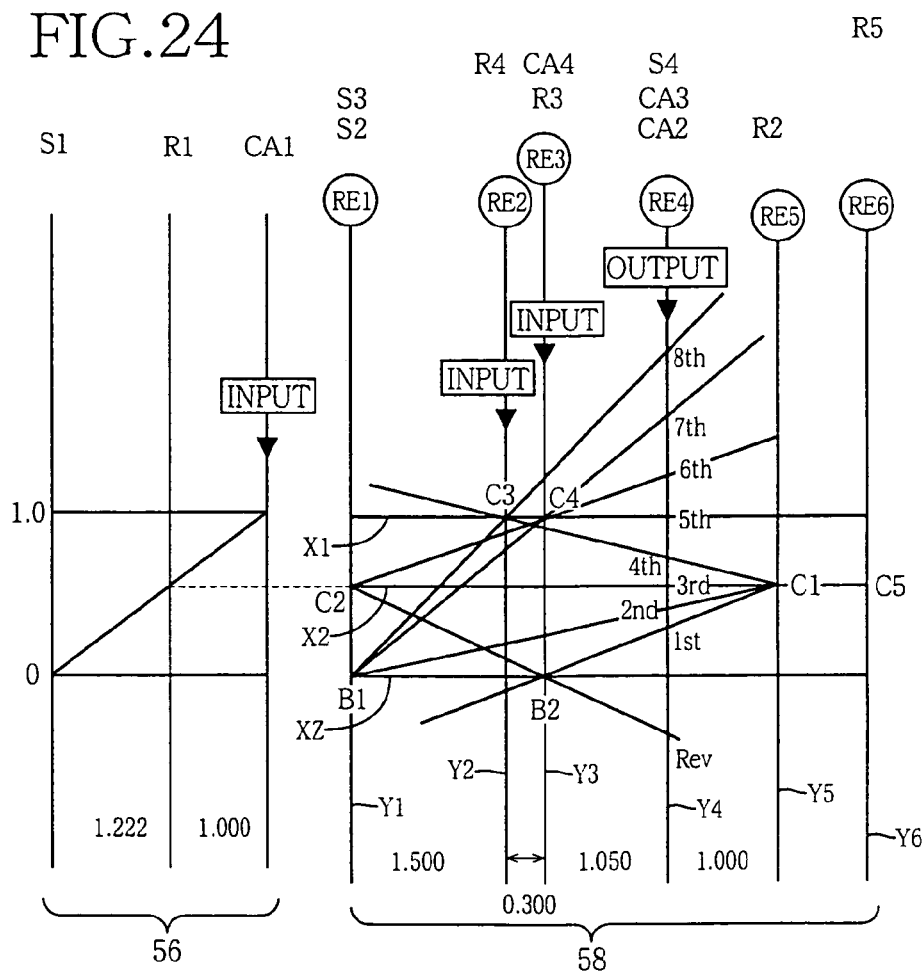
FIG. 23 is a view indicating a relationship between the operating positions of the automatic transmission of FIG. 22 and respective combinations of operating states of hydraulically operated frictional coupling devices, when a normal-spread group of operating positions is selected.
FIG. 24 is a collinear chart showing an operation of the automatic transmission of FIG. 22 when the normal-spread group of operating positions is selected.

In the transmission 50 constructed as described above, a selected one of eight forward-drive positions (1st through 8th) and a rear-drive position (Rev) is established by simultaneous engaging actions of a corresponding combination of two frictional coupling devices selected from the first through fifth clutches C1-C5 and first and second B1, B2, as shown in FIG. 23. The eight forward-drive positions have respective speed ratios γ1-γ8 that change as geometric series. The gear ratio γ is equal to $N_{IN}/N_{OUT}$, where $N_{IN}$ and $N_{OUT}$ represent rotating speeds of the input shaft 16 and the output gear 28, respectively.

As shown in FIG. 23, the first-speed position (1st) having the highest speed ratio γ1 of about 3.550, for example, is established by engaging actions of the first clutch C1 and the second brake B2. The second-speed position (2nd) having the speed ratio γ2 of about 2.456, for example, which is lower than that of the first-speed position, is established by engaging actions of the first clutch C1 and the first brake B1. The third-speed position (3rd) having the speed ratio γ3 of about 1.818, for example, which is lower than that of the second-speed position, is established by engaging actions of the first and second clutches C1 and C2. The fourth-speed position (4th) having the speed ratio γ4 of about 1.349, for example, which is lower than that of the third-speed position, is established by engaging actions of the first and third clutches C1 and C3. The fifth-speed position (5th) having the speed ratio γ5 of about 1.000 for example, which is lower than that of the fourth-speed position, is established by engaging actions of the third and fourth clutches C3 and C4. The sixth-speed position (6th) having the speed ratio γ6 of about 0.792, for example, which is lower than that of the fifth-speed position, is established by engaging actions of the second and fourth clutches C2 and C4. The seventh-speed position (7th) having the speed ratio γ7 of about 0.632, for example, which is lower than that of the sixth-speed position, is established by engaging actions of the fourth clutch C4 and first brake B1. The eighth-speed position (8th) having the speed ratio γ8 of about 0.526, for example, which is lower than that of the seventh-speed position, is established by engaging actions of the third clutch C3 and the first brake B1.

The rear-drive position (Rev) having a speed ratio $\gamma_R$ of 2.597, for example, which is intermediate between those of the first-speed and second-speed positions, is established by engaging actions of the second clutch C2 and the second brake B2. The first-speed through eighth-speed positions (1st through 8th) indicated in FIG. 23 constitute the narrow-spread group of forward-drive positions having a set of speed ratios γ1-γ8. The speed ratios ρ1-ρ5 of the first through fifth planetary gear sets 18, 20, 22, 24, 25 are determined to establish the above-indicated speed ratios γ1-γ8 and $\gamma_R$ of the nine operating positions (1st trough 8th, and Rev).

In the specific example of FIG. 23, stepping ratios of the adjacent forward-drive positions of the normal-spread group of the transmission 50, and an overall speed ratio range ("spread") of the narrow-spread group of eight forward-drive positions are determined as described below. Namely, the stepping ratio (γ1/γ2) which is a ratio of the speed ratio γ1 of the first-speed position to the speed ratio γ2 of the second-speed position is 1.445, and the stepping ratio (γ2/γ3) which is a ratio of the speed ratio γ2 of the second-speed position to the speed ratio γ3 of the third-speed position is 1.351. The stepping ratio (γ3/γ4) which is a ratio of the speed ratio γ3 of the third-speed position to the speed ratio γ4 of the fourth-speed position is 1.348. The stepping ratio (γ4/γ5) which is a ratio of the speed ratio γ4 of the fourth-speed position to the speed ratio γ5 of the fifth-speed position is 1.349. The stepping ratio (γ5/γ6) which is a ratio of the speed ratio γ5 of the fifth-speed position to the speed ratio γ6 of the sixth-speed position is also 1.263. The stepping ratio (γ6/γ7) which is a ratio of the speed ratio γ6 of the sixth-speed position to the speed ratio γ7 of the seventh-speed position is 1.254, and the stepping ratio (γ7/γ8) which is a ratio of the speed ratio γ7 of the seventh-speed position to the speed ratio γ8 of the eighth-speed position is 1.200. Thus, the speed ratios γ1-γ8 change as the geometric series. The overall speed ratio range or "spread"=γ1/γ8=3.550/0.526) of the narrow-spread group of eight forward-drive positions is about 6.745, which is relatively narrow.

The collinear chart of FIG. 24 indicates, by straight lines, a relationship among the rotating speeds of the rotary elements of the first and second shifting portions 56, 58 when the transmission 50 is placed in each of its operating positions. A portion of this collinear chart of FIG. 24 which represents the first shifting portion 56 is identical with that of FIG. 3 which represents the first shifting portion 36, except for the distances between the adjacent ones of the three vertical lines, which distances are determined by the gear ratio ρ1 of the first planetary gear device 18. Six vertical straight lines Y1-Y6 on the right side of the above-indicated three vertical straight lines respectively correspond to a first rotary element RE1 in the form of the second and third sun gears S2, S3 connected to each other, a second rotary element RE2 in the form of the fourth ring gear R4, a third rotary element RE3 in the form of the third ring gear R3 and fourth carrier CA4 connected to each other, a fourth rotary element RE4 in the form of the second and third carriers CA2, CA3 and fourth sun gear S4 which are connected to each other, a fifth rotary element RE5 in the form of the second ring gear R2, and a sixth rotary element RE6 ion the form of the second ring gear R2. The distances between the adjacent ones of the vertical straight lines Y1-Y5 are determined by the gear ratios ρ2-ρ5 of the second, third, fourth and fifth planetary gear sets 20, 22, 24, 25.

Referring to the collinear chart of FIG. 24, the arrangement of the present transmission 50 will be described in further detail. In the first shifting portion 56, the first carrier CA1 which is one of the three rotary elements of the first planetary gear set 18 is connected to the input shaft 16 (input rotary member) and the first intermediate output path M1, and the first sun gear S1 which is another of the three rotary elements is non-rotatably fixed to the transmission casing 12 (non-rotatable member), while the first ring gear R1 which is the third rotary element is connected to the second intermediate output path M2, so that the rotary motion of the input shaft 16 is transmitted to the second shifting portion 58 through the first intermediate output path M1, and the second intermediate output path M2 the rotating speed of which is reduced with respect to that of the first intermediate output path M1. In the second shifting portion 58, the first rotary element RE1 in the form of the second and third sun gears S2, S3 is selectively connected through the second clutch C2 to the first ring gear R1 (second intermediate output path M2), and selectively fixed by the second brake B2 to the transmission casing 12, and the second rotary element RE2 in the form of the fourth ring gear R4 is selectively connected through the third clutch C3 to the first carrier CA1 (first intermediate output path M1). The third rotary element RE3 in the form of the third ring gear R3 and fourth carrier CA4 is selectively connected through the fourth clutch C4 to the first carrier CA1, and selectively fixed by the second brake B2 to the transmission casing 12, and the four rotary element RE4 in the form of the second and third carriers CA2, CA3 and fourth sun gear S4 is connected to the output gear 28. The fifth rotary element RE5 in the form of the second ring gear R2 is selectively connected through the first clutch C1 to the first ring gear R1, and the sixth rotary element RE6 in the form of the fifth ring gear R5 is selectively connected through the fifth clutch C5 to the first ring gear R1.

As is apparent from the collinear chart of FIG. 24, a selected one of the nine operating positions (1st through 8th and Rev) of the transmission 50 is established by simultaneous engaging actions of the corresponding combination of two frictional coupling devices selected from among the first clutch C1, second clutch C2, third clutch C3, fourth clutch C4, fifth clutch C5, first brake B1 and second brake B2, so that the corresponding rotary elements selected from the first through sixth rotary elements RE1-RE65 are connected to the first intermediate output path M1, for rotation at a speed corresponding to the speed ratio of 1.0, or connected to the second intermediate output path M2, for rotation at the speed N×2, or fixed to the transmission casing 12 and held stationary. The rotating speeds of the output gear 28 when the transmission 50 is placed in the nine operating positions ($1^{st}$-speed through $8^{th}$-speed positions, and rear-drive position Rev) are indicated along the vertical straight line Y4. In the first-speed position, for example, the fifth rotary element RE5 is connected through the engaged first clutch C1 to the second intermediate output path M2, and is rotated at the speed N×2, while the third rotary element RE3 is fixed by the engaged second brake B2 to the transmission casing 12 and is held stationary. In this case, the rotating speed of the output gear 28 is represented by a point of intersection of the vertical straight line Y4 and an inclined straight line which connects a point of intersection (indicated at "1st" in FIG. 19) between the vertical straight line Y5 and the horizontal straight line X2 and a point of intersection between the vertical straight line Y3 and the horizontal straight line XZ.

Figures 25, 26:
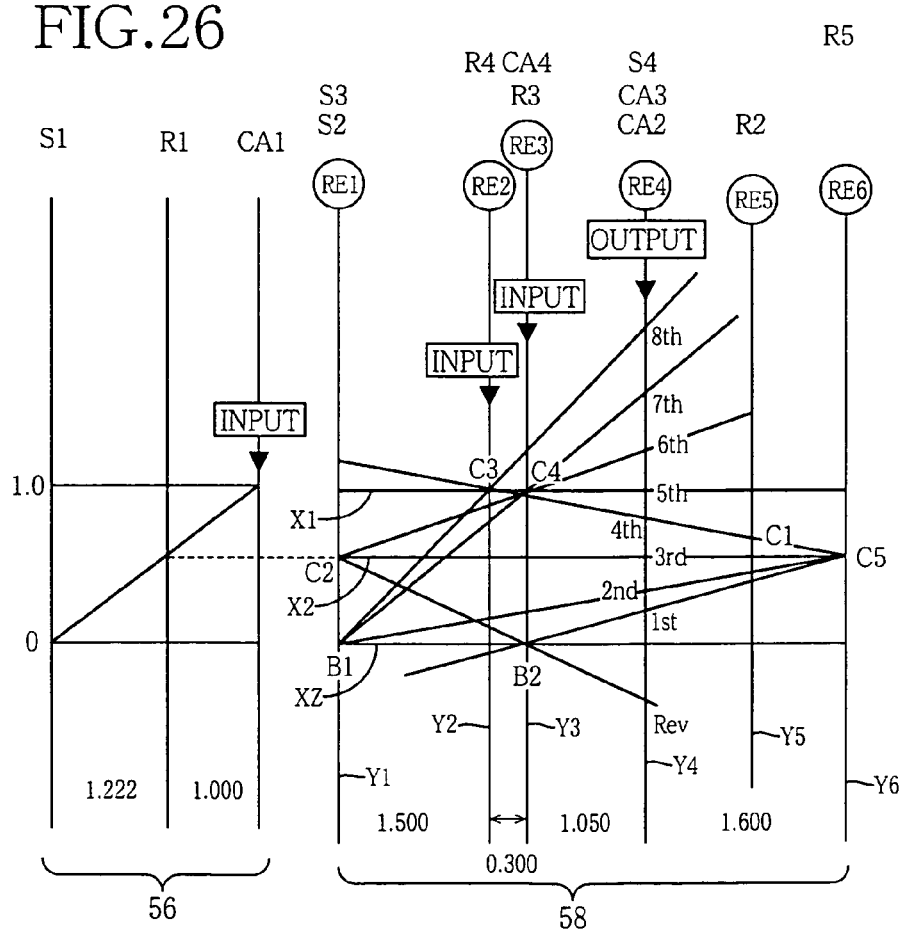
FIG. 25 is a view indicating a relationship between the operating positions of the automatic transmission of FIG. 22 and respective combinations of operating states of the frictional coupling devices, when a wide group of operating positions is selected.
FIG. 26 is a collinear chart showing an operation of the automatic transmission of FIG. 22 when the wide-spread group of operating positions of the automatic transmission is selected.

As described above, the first-speed through eighth-speed positions (1st through 8th) indicated in FIG. 23 constitute the narrow-spread group of forward-drive positions which has the set of speed ratios γ1-γ8 and a relatively narrow overall speed ratio range or spread. The first-speed through fourth-speed positions are established by engaging the first clutch C3 as well as the second brake B2, first brake B1, second clutch C2 and third clutch C3, respectively. The present transmission 50 further has a normal-spread or width-spread group of nine operating positions wherein the first-speed through fourth-speed positions "1st", "2nd", "3rd" and "4th" are established by engaging the fifth clutch C5 in place of the first clutch C1, as well as the second brake B2, first brake B2, second clutch C2 and third clutch C3, respectively, as indicated in FIGS. 25 and 26. The speed ratios of these first-speed through fourth-speed positions of the normal-spread or wide-spread group of operating positions of FIG. 25, which are established by engaging the fifth clutch C5, are lower than or equal to those of the narrow-spread group of operating positions of FIG. 23, which are established by engaging the first clutch C1, and are determined by the position of the sixth rotary element RM6 (fifth ring gear R5) in the direction parallel to the horizontal axis of the collinear chart of FIG. 26. That is, the speed ratios of the first-speed through fourth-speed positions of the normal-spread or wide-spread group are determined by a gear ratio ρ5 of the fifth planetary gear set 25.

The normal-spread or wide-spread group of operating positions indicated in FIGS. 25 and 26 is different from the narrow-spread group of operating positions indicated in FIGS. 23 and 24, only in the combinations of the two frictional coupling devices to be engaged to establish the first-speed through fourth-speed positions and in the speed ratios of these four forward-drive positions. Namely, the first-speed position having a speed ratio γ1 of about 4.589, for example, is established by engaging the fifth clutch C4 as well as the second brake B2, and the second-speed position having a speed ratio γ2 of about 2.839 is established by engaging the fifth clutch C5 as well as the first brake B1, while the third-speed position having a speed ratio γ3 of about 1.818 is established by engaging the fifth clutch C5 as well as the second clutch C2. The fourth-speed position having a speed ratio of γ4 of about 1.259 is established by engaging the fifth clutch C5 as well as the third clutch C3. The speed ratios γ1 and γ2 of the first-speed and second-speed positions of the normal-spread or wide-spread group are larger than those of the narrow-spread group of FIG. 23, and the speed ratios γ3 and γ4 of the third-speed and fourth-speed positions of the normal-spread or wide-spread group are respectively equal to and slightly smaller than those of the narrow-spread group of FIG. 23. The overall speed ratio range or spread (=γ1/γ8=8.719) of the normal-spread or wide-spread group of FIG. 25 is accordingly wider than that (6.745) of the narrow-spread group of FIG. 23. Accordingly, the transmission 50 placed in the first-speed or second-speed position of the normal-spread or wide-spread group (having a comparatively wide spread) provides a larger drive torque than in the corresponding position of the normal-spread group of Fog. 23. Therefore, the first-speed and second-speed positions of the normal-spread or wide-spread group of forward-drive positions of FIG. 25 can be effectively used where a relatively large vehicle drive force is required for starting of the vehicle, or rapid acceleration of the vehicle at a relatively low running speed. Thus, the transmission 50 has the narrow-spread group of forward-drive positions of FIG. 23 and the normal-spread or wide-spread group of forward-drive positions of FIG. 25. When the first-speed through fourth-speed position of the normal-spread or wide-spread group of FIG. 25 are established by engaging the fifth clutch C5, the sixth rotary element RE6 is connected to the second intermediate output path M2.

Figures 27, 28:
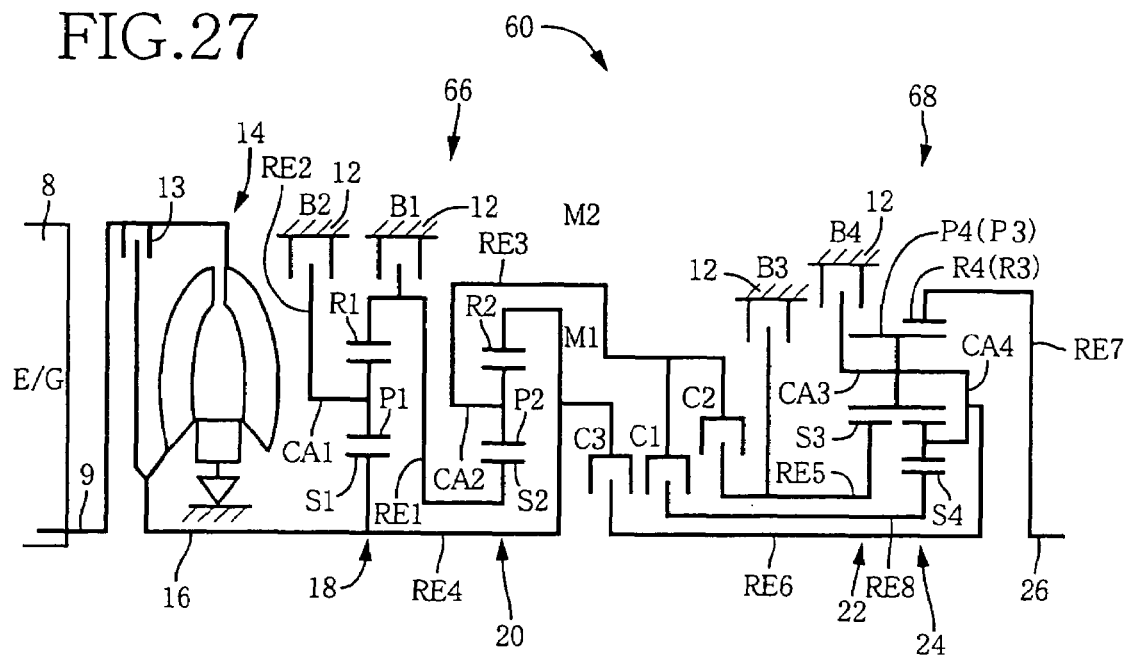
FIG. 27 is a schematic view corresponding to that of FIG. 1, illustrating a basic arrangement of a planetary gear type multiple-step automatic transmission for a vehicle, which is constructed according to a fifth embodiment of the present invention.
FIG. 28 is a view indicating a relationship between the operating positions of the automatic transmission of FIG. 27 and respective combinations of operating states of hydraulically operated frictional coupling devices, when a normal-spread group of operating positions is selected.

As shown in the schematic view of FIG. 27, an automatic transmission 60 according to a fifth embodiment includes a first shifting portion 66 having the first and second planetary gear sets 18, 20, and a second shifting portion 68 having the third and fourth planetary gear sets 22, 24. The transmission 60 has a normal-spread group of ten operating positions indicated in the table of FIG. 28 and the collinear chart of FIG. 29.

Each of the first and second planetary gear sets 18, 20 of the first shifting portion 66 of the transmission 60 is of a single-pinion type. The first planetary gear set has a first sun gear S1, a first planetary gear P1, a first carrier P1 supporting the first planetary gear P1 such that the first planetary gear P1 is rotatable about its axis and rotatable about the axis of the first sun gear S1, and a first ring gear R1 meshing with the first sun gear S1 through the first planetary gear P1. The first planetary gear set 18 has a gear ratio ρ1 of about 0.429. The second planetary gear set 20 has a second sun gear S2, a second planetary gear P2, a second carrier CA2 supporting the second planetary gear P2 such that the second planetary gear P2 is rotatable about its axis and rotatable about the axis of the second sun gear S2, and a second ring gear R2 meshing with the second sun gear S2 through the second planetary gear P2. The second planetary gear set 20 has a gear ratio ρ1 of about 0.539.

In the first shifting portion 66, the first ring gear R1 and second sun gear S2 which are integrally connected to each other are selectively fixed by a first brake B1 to the non-rotatable member in the form of the transmission casing 12, and the first carrier CA1 is selectively fixed by a second brake B2 to the transmission casing 12, while the second carrier CA2 functions as the second intermediate output member connected to the second intermediate output path M2. The first sun gear S1 and second ring gear R2, which are integrally connected to each other, are function as the first intermediate output member connected, and are connected to the input shaft 16 and the first intermediate output path M1. The first shifting portion 66 is arranged to transmit a rotary motion of the input shaft 16 to the second shifting portion 68 through the first intermediate output path M1, and the second intermediate output path M2 the speed of which is reduced with respect to that of the first intermediate output path M1. Although the first shifting portion 66 in the present fifth embodiment is arranged such that the first intermediate output path M1 is connected to the input shaft 16 and is rotated with the input shaft 16, the first intermediate output path M1 need not be connected to the input shaft 16.

The third planetary gear set 22 of the second shifting portion 68 is of a single-pinion type, and the fourth planetary gear set 24 is of a double-pinion type. The third planetary gear set 22 has a third sun gear S3, a third planetary gear P3, a third carrier CA3 supporting the third planetary gear P3 such that the third planetary gear P3 is rotatable about its axis and rotatable about the axis of the third sun gear S3, and a third ring gear R3 meshing with the third sun gear S3 through the third planetary gear P3. The third planetary gear set 24 has a gear ratio ρ3 of about 0.550, for example. The fourth planetary gear set 24 has a fourth sun gear S4, a plurality of pairs of fourth planetary gears P4, a fourth carrier CA4 supporting the fourth planetary gears P4 such that each fourth planetary gear P4 is rotatable about its axis and rotatable about the axis of the fourth sun gear S4, and a fourth ring gear R4 meshing with the sun gear S4 through the fourth planetary gears P4. The fourth planetary gear set 24 a gear ratio ρ4 of about 0.497, for example.

The third and fourth planetary gear sets 22, 24 are arranged such that the third and fourth carriers CA3, CA4 are constituted by a single common component, and the third and fourth ring gears R3, R4 are constituted by a single common component, while the third planetary gear P3 also functions as one of the two meshing third planetary gears P4. Each of the single common components indicated above may be two separate components.

In the second shifting portion 68, the third sun gear S3 is selectively connected through a second clutch C2 to the second intermediate output path M2, namely, to the second carrier CA2 functioning as the second intermediate output member, and is selectively fixed by a third brake B3 to the non-rotatable member in the form of the transmission casing 12. The third and fourth carriers CA3, CA4, which are integrally connected to each other, are selectively connected through a third clutch C3 to the first intermediate output path M1, namely, to the first sun gear S1 and the second ring gear R2, which function as the first intermediate output member, and is selectively fixed by a fourth brake B4 to the transmission casing 12. The third and fourth ring gears R3, R4, which are integrally connected to each other, are connected to the output member in the form of the output shaft 26, and the fourth sun gear S4 is selectively connected through a first clutch C1 to the second carrier CA2 functioning as the second intermediate output member.

The first, second and third clutches C1-C3 and the first through fourth brakes B1-B4 are all hydraulically operated frictional coupling devices widely used in known step-variable automatic transmissions, multiple-disc type frictional coupling devices, as described above with respect to the first embodiment.

In the transmission 60 constructed as described above, a selected one of eight forward-drive positions (1st through 8th) and two rear-drive positions (R1, R2) are established by simultaneous engaging actions of a corresponding combination of two or three frictional coupling devices selected from the first, second and third clutches C1-C5 and the first through fourth brakes B1, B2, as shown in FIG. 28. The eight forward-drive positions have respective speed ratios γ1-γ8 that change as geometric series. The gear ratio γ is equal to $N_{IN}/N_{OUT}$, where $N_{IN}$ and $N_{OUT}$ represent rotating speeds of the input shaft 16 and the output shaft 26, respectively.

As shown in FIG. 28, the first-speed position (1st) having the highest speed ratio γ1 of about 4.020, for example, is established by engaging actions of the first clutch C1 and the second and fourth brakes B2, B4. The second-speed position (2nd) having the speed ratio γ2 of about 2.717, for example, which is lower than that of the first-speed position, is established by engaging actions of the first clutch C1 and the second and third brakes B2, B3. The third-speed position (3rd) having the speed ratio γ3 of about 2.000, for example, which is lower than that of the second-speed position, is established by engaging actions of the first and second clutches C1, C2 and the second brake B2. The fourth-speed position (4th) having the speed ratio γ4 of about 1.538, for example, which is lower than that of the third-speed position, is established by engaging actions of the first and second clutches C1 and C2 and the first brake B1. The fifth-speed position (5th) having the speed ratio γ5 of about 1.211, for example, which is lower than that of the fourth-speed position, is established by engaging actions of the first and third clutches C1 and C3 and the first brake B1. The sixth-speed position (6th) having the speed ratio γ6 of about 1.000, for example, which is lower than that of the fifth-speed position, is established by engaging actions of the first, second and third clutches C1-C3. The seventh-speed position (7th-2)) having the speed ratio γ7 of about 0.784, for example, which is lower than that of the sixth-speed position, is established by engaging actions of the second and third clutches C2 and C3 and the second brake B2. The eighth-speed position (8th) having the speed ratio γ8 of about 0.645, for example, which is lower than that of the seventh-speed position, is established by engaging actions of the third clutch C3 and the third brake C3.

The first rear-drive position (R1) having a speed ratio $\gamma_{R1}$ of 3.636, for example, which is intermediate between those of the first-speed and second-speed positions, is established by engaging actions of the second clutch C2 and the second and fourth brakes B2, B4, and the second rear-drive position (R2) having a speed ratio $\gamma_{R2}$ of 2.797, for example, which is lower than that of the first rear-drive position and is almost equal to the second to that of the second-speed position, is established by engaging actions of the second clutch C2 and the first and fourth brakes B1, B4. The first-speed through eighth-speed positions (1st through 8th) indicated in FIG. 28 constitute a normal-spread group of forward-drive positions having a set of speed ratios γ1-γ8. The speed ratios ρ1-ρ4 of the first through fourth planetary gear sets 18, 20, 22, 24 are determined to establish the above-indicated speed ratios γ1-γ8, $\gamma_{R1}$ and $\gamma_{R2}$ of the ten operating positions (1st trough 8th, R1, and R2).

In the specific example of FIG. 28, stepping ratios of the adjacent forward-drive positions of the normal-spread group of the transmission 60, and an overall speed ratio range ("spread") of the normal-spread group of eight forward-drive positions are determined as described below. Namely, the stepping ratio (γ1/γ2) which is a ratio of the speed ratio γ1 of the first-speed position to the speed ratio γ2 of the second-speed position is 1.480, and the stepping ratio (γ2/γ3) which is a ratio of the speed ratio γ2 of the second-speed position to the speed ratio γ3 of the third-speed position is 1.358. The stepping ratio (γ3/γ4) which is a ratio of the speed ratio γ3 of the third-speed position to the speed ratio γ4 of the fourth-speed position is 1.300. The stepping ratio (γ4/γ5) which is a ratio of the speed ratio γ4 of the fourth-speed position to the speed ratio γ5 of the fifth-speed position is 1.271. The stepping ratio (γ5/γ6) which is a ratio of the speed ratio γ5 of the fifth-speed position to the speed ratio γ6 of the sixth-speed position is also 1.211. The stepping ratio (γ6/γ7) which is a ratio of the speed ratio γ6 of the sixth-speed position to the speed ratio γ7 of the seventh-speed position is 1.275, and the stepping ratio (γ7/γ8) which is a ratio of the speed ratio γ7 of the seventh-speed position to the speed ratio γ8 of the eighth-speed position is 1.216. Thus, the speed ratios γ1-γ8 change as the geometric series. The overall speed ratio range or "spread"=γ1/γ8=4.020/0.645) of the normal-spread group of eight forward-drive positions is about 6.231, which is relatively wide.

Figure 29:
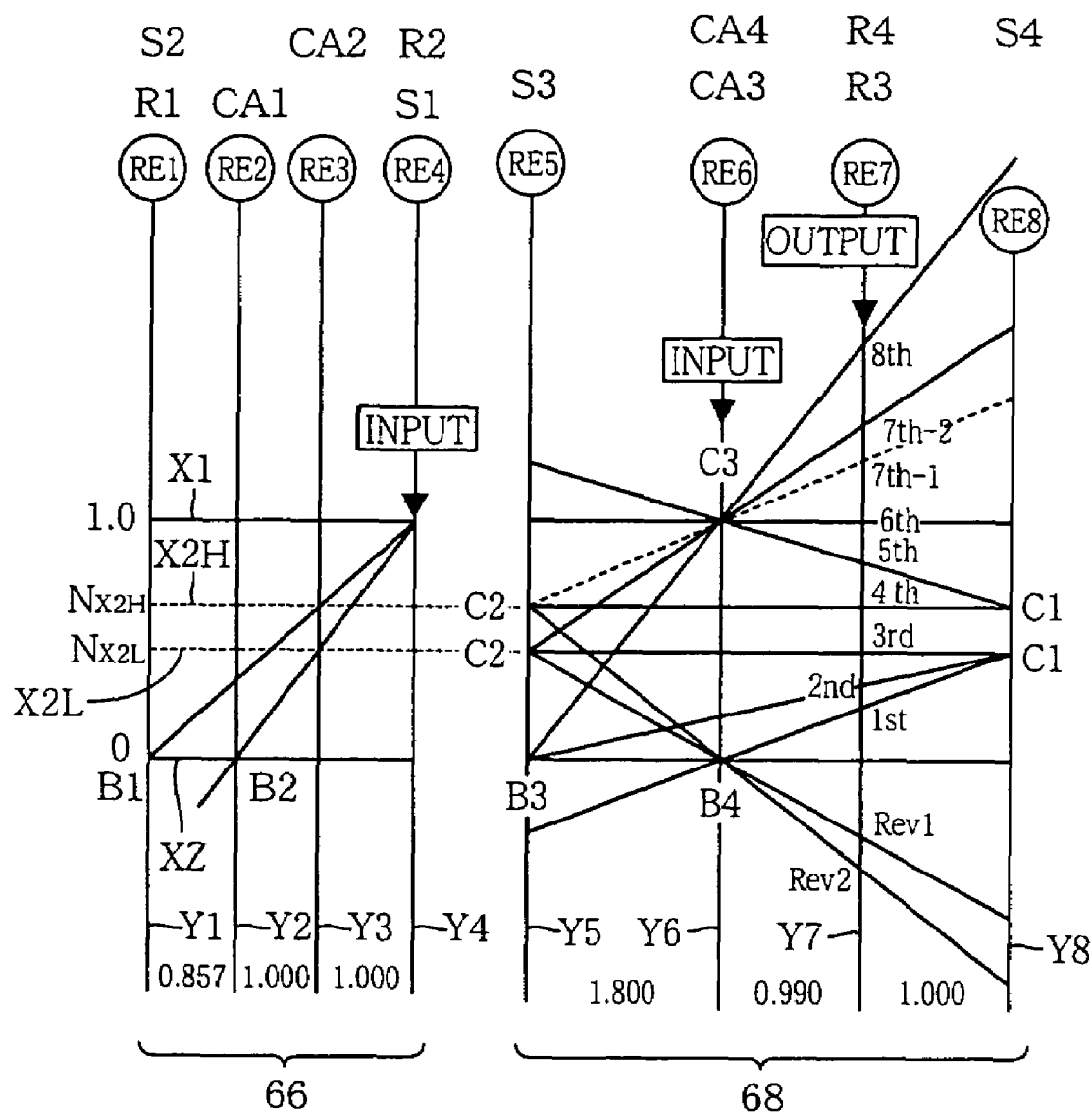
FIG. 29 is a collinear chart showing an operation of the automatic transmission of FIG. 27 when the normal-spread group of operating positions is selected.

The collinear chart of FIG. 29 indicates, by straight lines, a relationship among the rotating speeds of the rotary elements of the first and second shifting portions 66, 68 when the transmission 60 is placed in each of its operating positions. The collinear chart of FIG. 29 is a two-dimensional coordinate system which has a horizontal axis and a vertical axis and in which the gear ratios ρ1-ρ4 of the first through fourth planetary gear sets 18, 20, 22, 24 are taken along the horizontal axis, while the relative rotating speeds of the rotary elements are taken along the vertical axis. A lowermost one of four horizontal straight lines X1, X2H, H2L, XZ, that is, the horizontal straight line XZ indicates the rotating speed of "0", while an uppermost one of the four horizontal lines X1, X2H, X2L, XZ, that is, the horizontal straight line X1 indicates the rotating speed corresponding to the speed ratio of 1.0, that is, the rotating speed of the first intermediate output path M1 connected to the input shaft 16. The intermediate two horizontal straight lines X2H and X2L between the uppermost and lowermost horizontal straight lines X1, XZ respectively indicate the rotating speeds N×2H and N×2L of the second intermediate output path M2, which are lower than the rotating speed of the first intermediate output path M1. First four vertical straight lines Y1-Y4 as counted from the left end of the collinear chart of FIG. 29 correspond to the first shifting portion 66, and respectively correspond to a first rotary element RE1 in the form of the first ring gear R1 and second sun gear S2 connected to each other, a second rotary element RE2 in the form of the first carrier CA1, a third rotary element RE3 in the form of the second carrier CA2, and a fourth rotary element RE4 in the form of the first sun gear S1 and second ring gear R2 connected to each other. The distances between the adjacent ones of those four vertical straight lines Y1-Y4 are determined by the gear ratios ρ1 and ρ2 of the first and second planetary gear sets 18, 20. Four vertical straight lines Y5-Y8 on the right side of the above-indicated four vertical straight lines Y1-Y4 correspond to the second shifting portion 68, and respectively correspond a fifth rotary element RE5 in the form of the third sun gear S3, a sixth rotary element RE6 in the form of the third and fourth carriers CA3, CA4 connected to each other, a seventh rotary element RE8 in the form of the third and fourth ring gears R3, R4 connected to each other, and an eighth rotary element RE8 in the form of the fourth sun gear S4. The distances between the adjacent ones of the vertical straight lines Y5-Y8 are determined by the gear ratios ρ3 and ρ4 of the third and fourth planetary gear sets 22, 24.

Referring to the collinear chart of FIG. 29, the arrangement of the present transmission 60 will be described in further detail. In the first shifting portion 66, the first rotary element RE1 (first ring gear R1 and second sun gear S2) is selectively fixed by a first brake B1 to the transmission casing 12, and the second rotary element RE2 (first carrier CA1) is selectively fixed by a second brake B1 to the transmission casing 12. The third rotary element RE3 (second carrier CA2) is connected to the second intermediate output path M2, and the fourth rotary element RE4 (first sun gear S1 and second ring gear R2) is connected to the input shaft 16 (input rotary member) and the first intermediate output path M1, so that the rotary motion of the input shaft 16 is transmitted to the second shifting portion 68 through the first intermediate output path M1, and the second intermediate output path M2 the rotating speed of which is reduced with respect to that of the first intermediate output path M1. In the second shifting portion 68, the fifth rotary element RE5 (third sun gear S3) is selectively connected through a second clutch C2 to the second carrier CA2 (second intermediate output path M2), and is selectively fixed by a third brake B3 to the transmission casing 12, and the sixth rotary element RE6 (third and fourth carriers CA3, CA4) is selectively connected through a third clutch C3 to the fist sun gear S1 and second ring gear R2 (first intermediate output path M1), and is selectively fixed by a fourth brake to the transmission casing 12. The seventh rotary element RE7 (third and fourth ring gears R3, R4) is connected to the output shaft 26, and the eighth rotary element RE8 (fourth sun gear S4) is selectively connected by a first clutch C1 to the second carrier CA2.

As is apparent from the collinear chart of FIG. 29, a selected one of the ten operating positions (1st through 8th, R1 and R2) of the transmission 60 is established by simultaneous engaging actions of the corresponding combination of two or three frictional coupling devices selected from among the first clutch C1, second clutch C2, third clutch C3, first brake B1, second brake B2, third brake B3 and fourth brake B4, so that the corresponding rotary elements selected from the first through eighth rotary elements RE1-RE8 are connected to the first intermediate output path M1, for rotation at a speed corresponding to the speed ratio of 1.0, or connected to the second intermediate output path M2, for rotation at the speed N×2L or N×2H, or fixed to the transmission casing 12 and held stationary. The rotating speeds of the output shaft 26 when the transmission 60 is placed in the ten operating positions ($1^{st}$-speed through $8^{th}$-speed positions, and first and second rear-drive positions R1, R2) are indicated along the vertical straight line Y7. In the first-speed position, for example, the second rotary element RE2 is fixed by the second brake B2 to the transmission casing 12 and held stationary, and the fourth rotary element RE4 is connected to the input shaft 16 and the first intermediate output path M1, for rotation at a speed corresponding to the speed ratio of 1.0. In this case, the rotating speed N×2L of the second intermediate output path M2 connected to the second shifting portion 68, which is reduced with respect to that of the first intermediate output path M1, is represented by a point of intersection of the vertical straight line Y3 and an inclined straight line which connects a point of intersection between the vertical straight line Y2 and the horizontal straight line XZ and a point of intersection between the vertical straight line Y4 and the horizontal straight line X1. The eighth rotary element RE8 is connected through the clutch C1 to the second intermediate output path M1 (carrier CA2), for rotation at the speed N×2L, and the sixth rotary element RE6 is fixed by the brake B4 to the transmission casing 12 and held stationary. The rotating speed of the output shaft 26 is represented by a point of intersection of the vertical straight line Y7 and an inclined line which connects a point of intersection between the vertical straight line Y8 and the horizontal straight line X2L and a point of intersection between the vertical straight line Y6 and the horizontal straight line XZ.

Figures 30, 31:
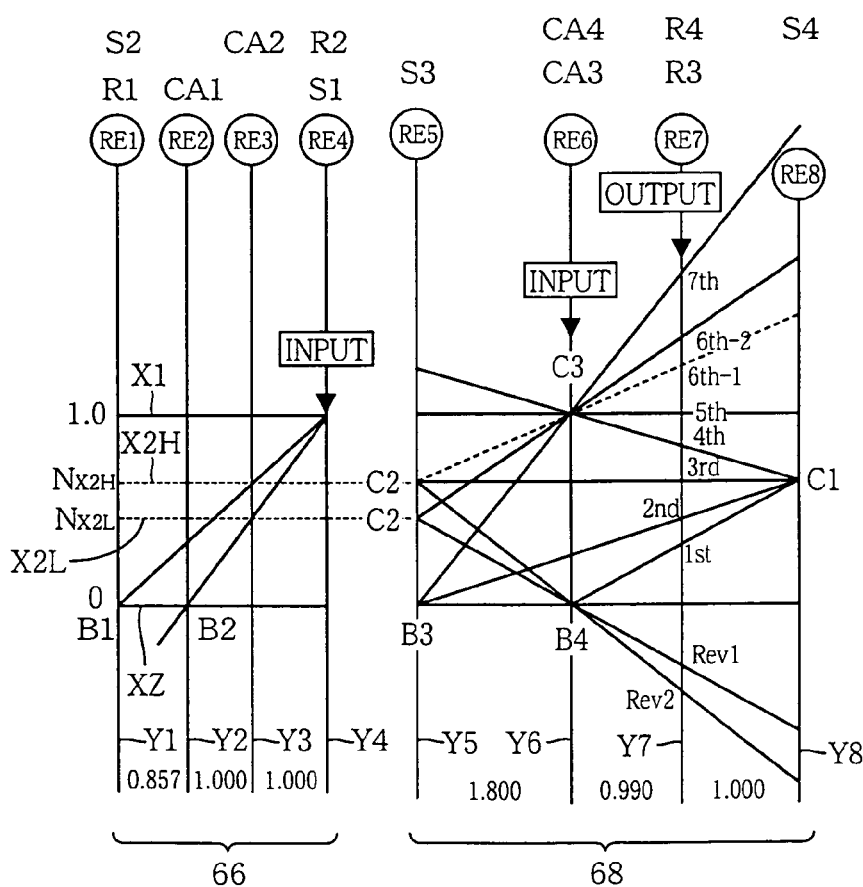
FIG. 30 is a view indicating a relationship between the operating positions of the automatic transmission of FIG. 27 and respective combinations of operating states of the frictional coupling devices, when a narrow group of operating positions is selected.
FIG. 31 is a collinear chart showing an operation of the automatic transmission of FIG. 27 when the narrow-spread group of operating positions of the automatic transmission is selected.

As described above, the first-speed through eighth-speed positions (1st through 8th) indicated in FIG. 28 constitute the normal-spread group of forward-drive positions which has the set of speed ratios γ1-γ8 and a relatively wide overall speed ratio range or spread. The first-speed, second-speed and third-speed positions of this normal-spread group are established by engaging the second brake B2 as well as the first clutch C1 and the fourth brake B4, third brake B3 and second clutch C2, respectively. The present transmission 60 further has a narrow-spread group of seven forward-drive positions (1st through 7th) wherein the first-speed and second-speed positions "1st" and "2nd" are established by engaging the first brake B1 in place of the second brake B2, as well as the first clutch C1 and the fourth brake B4, third brake B3 and second clutch C2, respectively, as indicated in FIGS. 30 and 31. As a result of engagement of the first brake B1 in place of the second brake B2, the rotating speed of the second intermediate output path M2 is changed from N×2L to N×2H. Accordingly, one of the normal-spread group of FIG. 28 and the narrow-spread group of FIG. 30 can be selected without changing the operating states of the first, second and third clutches C1-C3 and the third and fourth brakes B3, B4 which are used in the second shifting portion 68.

The narrow-spread group of operating positions indicated in FIGS. 30 and 31 is different from the normal-spread group of operating positions indicated in FIGS. 28 and 29, in that the narrow-spread group has a total of seven forward-drive positions (1st through 7th) while the normal-spread group has a total of eight forward-drive positions (1st through 8th), and in that the first-speed position (1st) of the narrow-spread group which has a highest speed ratio γ1 of about 3.092, for example, is established by engaging the first brake B1 as well as the first clutch C1 and fourth brake B4, and the second-speed position ($2^{nd}$ having) of the narrow-spread group which has a speed ratio γ2 of about 2.090, for example, is established by engaging the first brake B1 as well as the first clutch C1 and third brake B3, while the third-speed position (3rd) of the narrow-spread group which has a speed ratio γ1 of about 1.538, for example, is established by engaging the first brake B1 as well as the first clutch C1 and second clutch C2. The third-speed through seventh-speed positions of the narrow-spread group of FIG. 30 correspond to the fourth-speed through eighth-speed positions of the normal-spread group of FIG. 28, so that the narrow-spread group does not include a forward-drive position corresponding to the third-speed position of the normal-spread group, and therefore consists of the seven forward-drive positions (1st through 7th).

The stepping ratios of the adjacent forward-drive positions of the narrow-spread group of the transmission 60, and its overall speed ratio range ("spread") are determined as described below. Namely, the stepping ratio (γ1/γ2) which is a ratio of the speed ratio 71 of the first-speed position to the speed ratio γ2 of the second-speed position is 1.480, and the stepping ratio (γ2/γ3) which is a ratio of the speed ratio γ2 of the second-speed position to the speed ratio γ3 of the third-speed position is 1.358. The stepping ratio (γ3/γ4) which is a ratio of the speed ratio γ3 of the third-speed position to the speed ratio γ4 of the fourth-speed position is 1.271. The stepping ratio (γ4/γ5) which is a ratio of the speed ratio γ4 of the fourth-speed position to the speed ratio γ5 of the fifth-speed position is 1.211. The stepping ratio (γ5/γ6) which is a ratio of the speed ratio γ5 of the fifth-speed position to the speed ratio γ6 of the sixth-speed position is also 1.275. The stepping ratio (γ6/γ7) which is a ratio of the speed ratio γ6 of the sixth-speed position to the speed ratio 77 of the seventh-speed position is 1.216. Thus, the speed ratios γ1-γ7 change as the geometric series. The overall speed ratio range or "spread"=γ1/γ7=3.092/0.645) of the narrow-spread group of seven forward-drive positions is about 4.793, which is relatively narrow. It will be understood that the speed ratios of the third-speed through seventh-speed positions of the narrow-spread group are equal to those of the fourth-speed through eighth-speed positions of the normal-spread group, but the speed ratios of the first-speed and second-speed positions of the narrow-spread group are lowered with respect to those of the first-speed and second-speed positions of the normal-spread group, so that the stepping ratios $\gamma1/\gamma2$ and $\gamma2/\gamma3$ of the narrow-spread group are equal to those of the normal-spread group. The use of the narrow-spread group of FIG. 30 which consists of the seven forward-drive positions without the forward-drive position corresponding to the third-speed position (3rd) of the normal-spread group of FIG. 28 is effective to prevent frequent shifting actions of the transmission 60, which would take place when the operating amount Acc of the accelerator pedal or the running speed V of the vehicle is alternately increased and reduced frequently while the vehicle is running at a relatively low speed in an urban area. On the other hand, the use of the normal-spread group of FIG. 28 consisting of the eight forward-drive positions permits a comparatively smooth or gradual shifting of the transmission 60 while the vehicle is running in a steady state with the operating amount Acc of the accelerator pedal kept relatively constant. As is apparent from the collinear chart of FIG. 31 wherein the rotating speed of the output shaft 26 is indicated along the vertical straight line Y7, the rotating speed of the second intermediate output path M2 is changed to N×2H when one of the first-speed, second-speed and third-speed positions of the narrow-spread group of FIG. 30 is established by engaging the first brake B1 in place of the second brake B2. It is noted that the third-speed position (3rd) of the narrow-spread group of FIG. 30 corresponds the fourth-speed position (4th) of the normal-spread group of FIG. 28, namely, the output shaft 26 is rotated at N×2H when the transmission 60 is placed in the third-speed position of the narrow-spread group, as well as when the transmission 60 is placed in the fourth-speed position of the normal-spread group, as indicated in the collinear charts of FIGS. 29 and 31. As is also apparent from the collinear charts of FIGS. 29 and 31, the rotating speeds of the output shaft 26 in the fourth-speed through seventh-speed positions of the narrow-spread group of FIG. 30 are the same as in the fifth-speed through eighth-speed positions of the normal-spread group of FIG. 28.

The table of FIG. 32 indicates the forward-drive positions of the normal-spread group of FIG. 28 and the narrow-spread group of FIG. 30, which forward-drive positions are available in the eight ranges D through L that are selectively established by operating the shift lever 92, for example. One of the normal-spread and narrow-spread groups is selected, as described above by reference to FIGS. 13-16. When the range D is established while the normal-spread group of eight forward-drive positions of FIG. 28 is selected, all of the eight forward-drive positions (first-speed through eighth-speed positions) are available, and the transmission 60 is automatically shiftable to any one of those eight forward-drive positions. When the range D is selected while the narrow-spread group of seven forward-drive positions of FIG. 30 is selected the transmission 60 is automatically shiftable to any one of the seven forward-drive positions. As the selected range is changed in the direction from the range D toward the range L, the number of the forward-drive positions of the selected group is reduced, as described above by reference to FIG. 14. When the narrow-spread group is selected, the range 7 is not available, or the selection of the range 7 has the same effect as the range D.

As described above, the transmission 60 of FIG. 27 according to the fifth embodiment has the normal-spread group of eight forward-drive positions and the narrow-spread group of seven forward-drive positions.

Figures 33, 34:
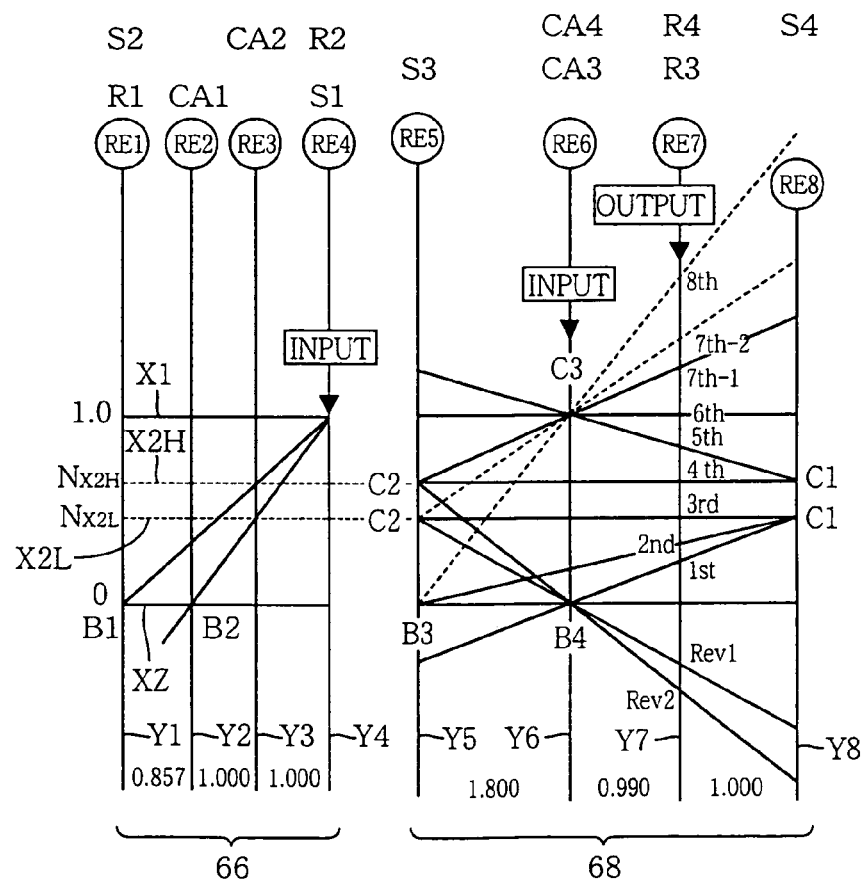
FIG. 33 is a view corresponding to that of FIG. 28, indicating a normal-spread group of operating positions of the automatic transmission of FIG. 27 according to a sixth embodiment of this invention.
FIG. 34 is a collinear chart showing an operation of the automatic transmission of FIG. 27 when the normal-spread group of operating positions of FIG. 33 is selected.

Referring next to FIGS. 33 and 34, there will be described a sixth embodiment of the present invention, which is a modification of the fifth embodiment of FIGS. 27-32. In the normal-spread group of eight forward-drive positions of FIGS. 28 and 29 of the fifth embodiment, the seventh-speed position (7th-2) is established by engaging the second brake B2 as well as the second and third clutches C2, C3. In the normal-spread group FIGS. 33 and 34 of the present sixth embodiment, the seventh-speed position (7th-1) is established by engaging the first brake B1 as well as the second and third clutches C2, C3.

In the normal-spread group of FIG. 33, the eight forward-drive positions have the same overall speed ratio range or spread ($\gamma1/\gamma8$=6.231) as those of the normal-spread group of FIG. 28, but the seventh-speed position (7th-1) has a speed ratio $\gamma7$ of about 0.831 higher than that of the normal-spread group of FIG. 28, and can be effectively used when a large vehicle drive force is required during a vehicle running at a relatively high speed, for example, during a high-speed running on an uphill road, or for rapid acceleration of the vehicle. In the present sixth embodiment, the normal-spread group of FIG. 33 and the narrow-spread group of FIG. 30 are selectively used. However, the sixth embodiment may be modified such that the transmission 60 is shiftable to any one of the eight forward-drive positions of FIG. 33, or to any one of the seven forward-drive positions (1st through 7th-1) of FIG. 33 while the selection of the eighth-speed position is inhibited. When the seven forward-drive positions of FIG. 33 are available, the overall speed ratio range or spread ($=\gamma1/\gamma7$=4.020/0.831) is 4.837, which is narrower than the overall speed ratio range (=0.020/0.784=5.127) of the seven forward-drive positions (1st through 7th-2) of the normal-spread group of FIG. 28. Therefore, where the use of the eighth-speed position (8th) is inhibited, the highest-speed position (7th-1) of FIG. 33 provides a larger vehicle drive force at a relatively high running speed of the vehicle, than the highest-speed position (7th-2) of FIG. 28. In this respect, the seven forward-drive positions (1st through 7th-2) of FIG. 28 may be used as the normal-spread group, while the seven forward-drive positions (1st through 7th-1) of FIG. 33 may be used as the narrow-spread group. As is apparent from the collinear chart of FIG. 34 wherein the rotating speed of the output shaft 26 is indicated along the vertical straight line Y7, the rotating speed of the second intermediate output path M2 is changed to N×2H when the seventh-speed position (7th-1) of the group of FIG. 33 is established by engaging the first brake B1 in place of the second brake B2. Thus, the transmission 60 according to the sixth embodiment has the normal-spread group of FIG. 33 wherein the seventh-speed position (7th-1) is established by engaging the first brake B1 as well as the second and third clutches C2, C3, and the narrow-spread group of FIG. 28 wherein the seventh-speed position (7th-2) is established by engaging the second brake B2 as well as the second and third clutches C2, C3. The sixth embodiment may be modified to selectively use the group consisting of the eight forward-drive positions (1st through 8th) of FIG. 33 and the group consisting of the seven forward-drive positions (1st through 7th-1) of FIG. 33, or alternatively a normal-spread group consisting of the seven forward-drive positions (1st through 7th-2) of FIG. 28 and a narrow-spread group consisting of the seven forward-drive positions (1st through 7th-1) of FIG. 33.

While the several embodiments of the present invention have been described above, the present invention may be otherwise embodied.

While the control routine including steps S1-S7 illustrated in the flow chart of FIG. 16 is formulated to select one of the normal-spread and narrow-spread groups of forward-drive positions of the transmission 10, a similar control routine is provided for selecting one of the normal-spread and wide-spread groups of forward-drive positions of the transmission 10, and for selecting one of the two groups of forward-drive positions of the transmissions 40, 50 and 60, and one of two groups of forward-drive positions of a transmission of any other arrangement. Further, the shift control apparatus according to the principle of this invention is applicable to control an automatic transmission which has three groups of forward-drive positions, namely, the normal-spread group, the narrow-spread group and the wide-spread group, rather than the normal-spread group and the narrow-spread or wide-spread group. In essence, the control routine of FIG. 16 or a control routine similar to this control routine is provided to control the automatic transmission such that one of a plurality of groups of forward-drive positions having respective different sets of speed ratios is selected upon switching of the shifting mode from the automatic shifting mode to the manual shifting mode, so that the selected group is the group which was selected last in the automatic shifting mode. Although the two groups of forward-drive positions selectively available in the transmissions 10, 40, 50 and 60 are different from each other in the speed ratio of at least one forward-drive position (i.e., seventh-speed and eighth-speed positions, first-speed through third-speed or fourth-speed positions, or seventh-speed position) having a relatively low or high speed ratio, the automatic transmission to be controlled by the shift control apparatus of the present invention may have a plurality of groups of forward-drive positions which are different from each other in the speed ratio of at least one high-speed forward-drive position having a relatively low speed ratio and at least one low-speed forward-drive position having a relatively high speed ratio.

In the transmissions 10, 40, 50, 60 in the illustrated embodiments, the first shifting portion 36, 46, 56, 66 including the first planetary gear set 18 or the first and second planetary gear sets 18, 20 is arranged to transmit the rotary motion of the input shaft 16 to the second shifting portion 38, 48, 58, 68 through the first intermediate output path M1 and the second intermediate output path M2 the speed of which is reduced with respect to that of the first intermediate output path M1. Where the transmission is of a parallel two-axes type having two parallel axes and two sets of counter gears, the first shifting portion 36, 46, 56, 66 may be modified to transmit the rotary motion of the input shaft 16 connected to one of the two axes to the second shifting portion 38, 48, 58, 68 provided on the other axis, through the two sets of counter gears which respectively correspond to the first and second intermediate output paths M1, M2 having different rotating speeds. In this case, one of the two sets of counter gears has a speed reduction ratio of 1.0, while the other set of counter gear has a speed reduction ratio higher than 1.0, so that the speed of the first intermediate output path M1 is equal to that of the input shaft 16, while the speed of the second intermediate output path M2 is reduced with respect to that of the first intermediate output path M1. The set of counter gears which corresponds to the first intermediate output path M1 and the above-indicated one of the two axes corresponds to the first intermediate output member, while the other set of counter gears which corresponds to the second intermediate output path M2 and the above-indicated other axis corresponds to the second intermediate output member. Although the above-described transmission of the parallel two-axes type has the two sets of counter gears corresponding to the first and second intermediate output paths, three or more sets of counter gears may be provided such that the rotary motion of the input shaft is transmitted to the second shifting portion through the corresponding three or more intermediate output paths, at the same or different speed ratio with respect to the speed of the input shaft. The transmission of the parallel two-axes type may use motion transmitting means other than the counter gears, such as a pulley-and-belt device, a sprocket mechanism, or a chain mechanism.

In the transmissions 10, 40, 50, 60, the engine 8 and the torque converter 14 are connected to each other through the crankshaft 9. However, the engine 8 may be operatively connected to the torque converter 14 through a gear train or a belt, and the engine 8 and the torque converter 14 need not be disposed coaxially with each other. The engine 8 may be replaced by any other type of drive power source, such an electric motor.

The transmissions 10, 40, 50, 60 may be modified such that a one-way clutch is connected in series or parallel with any one of the clutches C1-C5 and brakes B1-B4, for facilitating a shifting control of the transmission. For instance, a one-way clutch is connected in parallel with the third brake B3 of the transmission 10, so that the first-speed position can be established by engaging only the first clutch C1. Further, any one of the clutches C1-C5 and brakes B1-B4 may be replaced by a one-way clutch.

Although the torque converter 14 disposed as a fluid-operated power transmitting device between the engine 8 and the input shaft 16 is provided with the lock-up clutch 13, the torque converter 14 need not be provided with this lock-up clutch 13. Further, the torque converter 14 may be replaced by a fluid coupling, an electromagnetic clutch of a power type, or a hydraulically operated clutch of a multiple-disc or single-disc type.

Although the collinear charts of FIGS. 3, 5, 7, 9, 19, 21, 24, 26, 28, 31 and 34 are arranged such that the vertical straight lines Y1-Y5, Y1-Y6, Y1-Y8 are arranged in the rightward direction, these lines may be arranged in the leftward direction. While the horizontal straight line X1 corresponding to the speed ratio of 1.0 is located above the horizontal straight line XZ corresponding to the rotating speed of 0, the line X1 may be located below the line XZ.

While the transmissions 10, 40, 50, 60 use the hydraulically operated frictional coupling devices in the form of clutches C and brakes B, the transmission may use other types of frictional coupling devices such as electromagnetic clutches, powder-type clutches and any other electromagnetically operated coupling devices.

It is to be understood that the present invention may be embodied with various other changes, modifications and improvements, which may occur to those skilled in the art, in the light of the foregoing technical teachings.

What is claimed is:

1. A shift control apparatus for controlling shifting actions of a step-variable automatic transmission having a plurality of selectable groups of forward-drive positions having respective different sets of speed ratios, the automatic transmission having an automatic shifting mode in which the shifting actions take place automatically, and a manual shifting mode in which the shifting actions are manually controllable, said shift control apparatus comprising:

a drive-position-group selecting portion operable upon switching of a shifting mode of the automatic transmission from the automatic shifting mode to the manual shifting mode, to select one of said plurality of selectable groups of forward-drive positions in said manual shifting mode, on the basis of the group which was selected last in said automatic shifting mode.

2. The shift control apparatus according to claim 1, wherein said drive-position-group selecting portion is operable to select, in the manual shifting mode, one of said plurality of selectable groups of forward-drive positions which was selected immediately before a moment of the shifting of the shifting mode from the automatic shifting mode to the manual shifting mode.

3. The shift control apparatus according to claim 1, wherein each of said plurality of selectable groups of forward-drive positions includes at least one forward-drive position each having a speed ratio which is different from that of a corresponding one of the forward-drive positions of the other of said selectable groups.

4. The shift control apparatus according to claim 1, wherein said plurality of selectable groups of forward-drive positions have respective different numbers of the forward-drive positions.

5. The shift control apparatus according to claim 1, further comprising a manually operable shifting device manually operable to select one of the forward-drive positions of one of said plurality of selectable groups of the automatic transmission which has been selected by said drive-position-group selecting portion, and wherein said automatic transmission is manually controllable in said manual shifting mode by a manual operation of said manually operable shifting device.

6. The shift control apparatus according to claim 1, further comprising a manually operable shifting device manually operable to select one of a plurality of ranges in which the automatic transmission is automatically shiftable to a selected one of the successive forward-drive positions of one of said plurality of selectable groups of the automatic transmission which has been selected by said drive-position-group selecting portion, said plurality of ranges having respective different numbers of said successive forward-drive positions, and wherein said automatic transmission is manually controllable in said manual shifting mode by a manual operation of said manually operable shifting device.

7. The shift control apparatus according to claim 5, wherein said manually operable shifting device includes a shift lever having an auto-shift position in which the automatic transmission is placed in said automatic shifting mode.

8. The shift control apparatus according to claim 6, wherein said manually operable shifting device includes a shift lever having an auto-shift position in which the automatic transmission is placed in said automatic shifting mode.

9. The shift control apparatus according to claim 7, wherein said shift lever further has a manual-shift position in which the automatic transmission is placed in said manual shifting mode.

10. The shift control apparatus according to claim 8, wherein said shift lever further has a manual-shift position in which the automatic transmission is placed in said manual shifting mode.

11. The shift control apparatus according to claim 5, wherein said manually operable shifting device includes a shift lever having an auto-shift position in which the automatic transmission is placed in said automatic shifting mode, a manual shift-up position for manually shifting up the automatic transmission, and a manual shift-down position for manually shifting down the automatic transmission.

12. The shift control apparatus according to claim 6, wherein said manually operable shifting device includes a shift lever having an auto-shift position in which the automatic transmission is placed in said automatic shifting mode, a manual range shift-up position for shifting the selected one of said plurality of ranges in a direction to increase the number of said successive forward-drive positions of the group selected by said drive-position-group selecting portion, and a manual range shift-down position for shifting the selected one of said plurality of ranges in a direction to reduce the number of said successive forward-drive positions of the group selected by said drive-position-group selecting portion.

13. The shift control apparatus according to claim 6, wherein said manually operable shifting device includes a shift lever having an auto-shift position in which the automatic transmission is placed in said automatic shifting mode, and a plurality of range positions for selecting said plurality of ranges, respectively.

* * * * *